United States Patent [19]

Ueda et al.

[11] Patent Number: 5,432,570

[45] Date of Patent: Jul. 11, 1995

[54] CAMERA HAVING MEANS FOR RESTRICTING AN OPERATION BASED ON A STATE OF USE OF A RECORDING MEDIUM

[75] Inventors: Toshiharu Ueda, Yokohama; Akira Egawa, Kawasaki, both of Japan

[73] Assignee: Canon Kabushiki Kaisha, Tokyo, Japan

[21] Appl. No.: 341,043

[22] Filed: Nov. 15, 1994

Related U.S. Application Data

[63] Continuation of Ser. No. 888,829, May 27, 1992, abandoned.

[30] Foreign Application Priority Data

| May 27, 1991 | [JP] | Japan | 3-149340 |
| May 30, 1991 | [JP] | Japan | 3-153742 |
| Jun. 27, 1991 | [JP] | Japan | 3-181665 |
| Jul. 29, 1991 | [JP] | Japan | 3-210388 |
| Jul. 31, 1991 | [JP] | Japan | 3-213208 |

[51] Int. Cl.$^6$ .......................................... G03B 17/24
[52] U.S. Cl. ................................................. 354/105
[58] Field of Search .................... 354/21, 76, 105, 106, 354/207

[56] References Cited

U.S. PATENT DOCUMENTS

| 4,834,306 | 5/1989 | Robertson et al. | 242/348.3 |
| 4,864,332 | 9/1989 | Harvey | 354/21 |
| 4,878,075 | 10/1989 | Cannon | 354/106 X |
| 5,130,728 | 7/1992 | Goto et al. | 354/105 |
| 5,159,365 | 10/1992 | Takahashi et al. | 354/21 |
| 5,220,367 | 6/1993 | Matsuyama | 354/105 |

FOREIGN PATENT DOCUMENTS 3-6556  1/1991  Japan .

*Primary Examiner*—Howard B. Blankenship
*Assistant Examiner*—J. K. Han
*Attorney, Agent, or Firm*—Fitzpatrick, Cella, Harper & Scinto

[57] ABSTRACT

A camera which can be loaded with a cartridge for a recording medium with a recording portion is disclosed. The camera includes a processing circuit for reproducing at least recording data recorded in the recording portion. The camera further includes a detecting unit that detects a state of use of the recording medium independently from the data reproduced by the processing circuit. A control circuit is also provided. When the processing circuit cannot perform reproduction of the recording data, the control circuit restricts an operation of the camera on the basis of the state of use of the recording medium detected by the detecting unit.

9 Claims, 25 Drawing Sheets

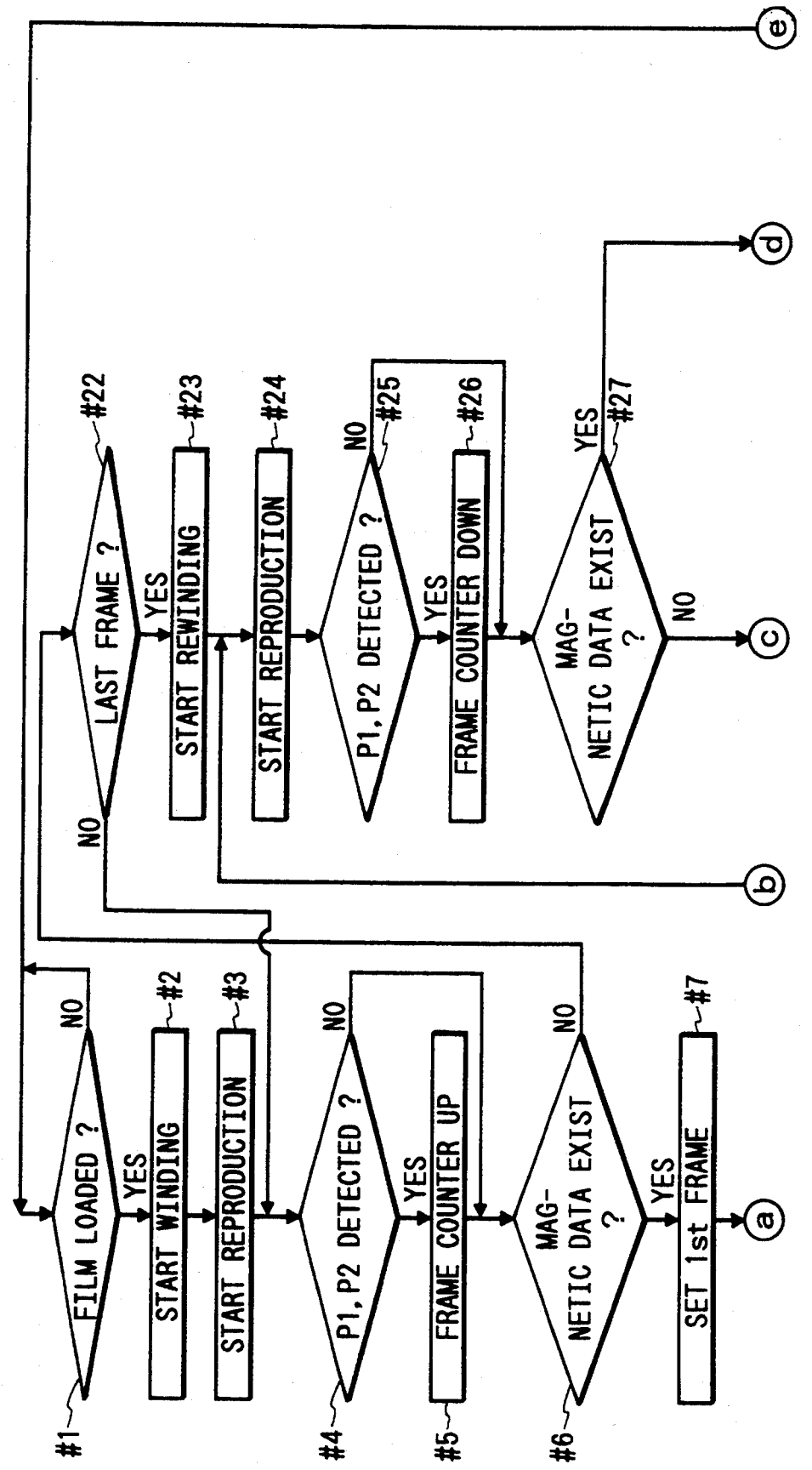

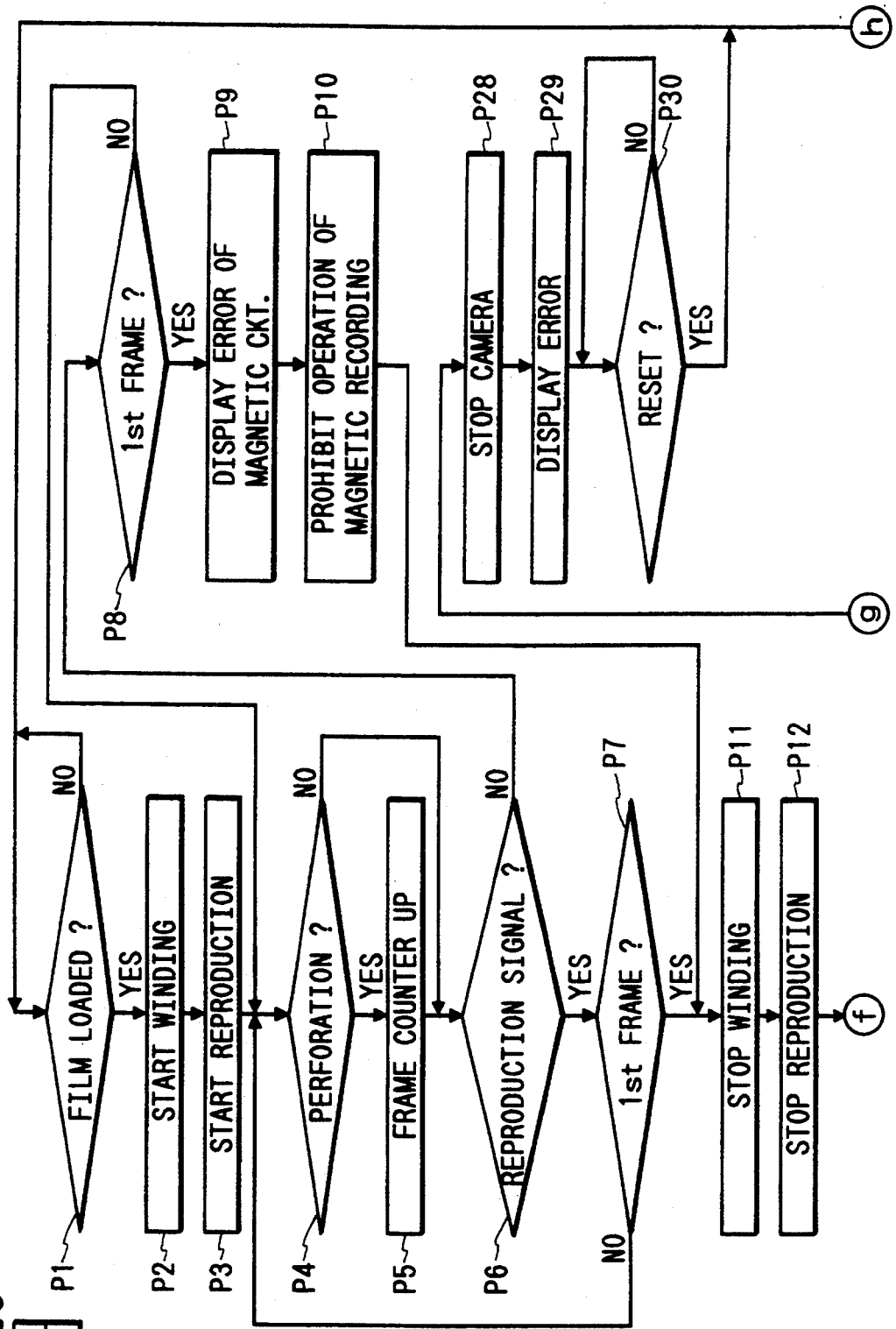

CAMERA HAVING MEANS FOR RESTRICTING AN OPERATION BASED ON A STATE OF USE OF A RECORDING MEDIUM

This application is a continuation of application Ser. No. 07/888,829, filed May 27, 1992, now abandoned.

BACKGROUND OF THE INVENTION

1. Field of the Invention

This invention relates to a camera which can be loaded with film having a magnetic recording portion.

2. Related Background Art

A camera which uses film having a magnetic recording portion in which data such as dates, shutter speeds and aperture values can be written into the magnetic recording portion and from which, as required, these data can be read out along with data such as pre-recorded film speed and the prescribed number of film frames is disclosed in U.S. Pat. No. 4,864,332, etc.

Also, a camera in which when photographing data such as shutter speed and aperture value and date data are recorded onto the magnetic recording portion after the photographing by the camera, the information that the film has been exposed is also recorded on the film simultaneously therewith and the partially exposed film is rewound so that when the film is to be reused in the same camera or a different camera, the heading of the film is effected on the basis of said information to enable the exposure of unexposed frames to be accomplished is proposed in U.S. Pat. No. 4,878,075.

Also, a camera which uses a film cartridge containing all of a film (including the leader portion thereof) therein and in which a supply spool in the film cartridge is rotated to thereby force the leader portion of the film out to the film take-up spool side of the camera is proposed in U.S. Pat. No. 4,834,306.

However, in the above-described examples of the prior art, the reading-out of the data such as the film speed pre-memorized in the magnetic recording portion of the film is effected only during the feeding of the film in one direction, such as the film, winding after the loading of the film and therefore, depending on the difference between individual cameras or the non-uniformity of film, the recording track on the film and the magnetic head of the camera sometimes do not contact each other accurately, and a magnetic signal sometimes cannot be read out due to an azimuth error caused by the head gap and the inclination of the recording track or to the off-track alignment caused by the positional deviation between the magnetic head and the recording track.

Also, there are cameras of two photographing types, i.e., the pre-wind type and the normal wind type, but when in the camera as disclosed in the above-mentioned U.S. Pat. No. 4,878,075, an attempt is made to effect photographing and data recording by a camera of the normal wind type up to an intermediate frame of film, and thereafter effect photographing and data recording on the subsequent frames by a camera of the pre-wind type, there occurrs the error as noted above.

When the data such as the film speed cannot be read out as described above, usually all the film is rewound to make photographing onto the film impossible and thus, the film was wasted.

Also, in the above-described examples of the prior art, the reproduced state of magnetically recorded data changes depending on the difference in the feeding speed, the difference between cameras, the difference between films, or the like, and this leads to the problem that the magnitude or frequency of a signal changes greatly. Also, the magnetic layer must be made thin in order to provide the film with a magnetic recording portion and therefore, the signal level unavoidably becomes small. Further, because of the necessity of effecting reproduction during the feeding of the film, the noise of a motor becomes greater as the load of the film becomes greater, and this poses the problem that the reproduction signal is deteriorated in S/N and the signal could often cannot be read.

Also, in the above-described examples of the prior art, when magnetic recording and reproduction cannot be effected, it cannot be judged whether there is no magnetic recording portion on the film, whether magnetically recorded data written by another camera is bad, or whether the reproduction circuit of the camera is bad. In some cases, this may be judged to be a problem and thus, there is the possibility that the camera no longer functions as a camera. That is, in the above-described examples of the prior art, no mention is made of any countermeasure for a case where a problem has occurred with magnetic recording means including a magnetic head for writing data onto the magnetic recording portion of the film, and it is generally considered that when a problem has occurred with the magnetic recording means, such trouble is regarded as a bad photographing operation, such as a bad shutter operation or a bad lens barrel operation of the camera, and the camera is rendered inoperative. However, if such a camera is constructed, there will arise the problem that photographing cannot be effected at all in spite of the fact that in The case of the problem with the magnetic recording means, it is possible to effect exposure on the film surface, except for the recording of data.

A technique whereby a film cartridge is endowed with the function of displaying the used state of film is proposed in Japanese Laid-Open Patent Application No. 3-6556.

SUMMARY OF THE INVENTION

One aspect of the invention is to provide a camera provided with discrimination means for discriminating whether information is being reproduced by a magnetic head during the information reproducing operation, and control means for reversing the direction of feeding of film by film feeding means when it is discriminated by said discrimination means; that the reproduction of the information is not being effected even if the last frame of the film is detected by last frame detecting means, and instructing the magnetic head to reproduce the information in said reversed direction of feeding.

Other objects of the present invention will become apparent from the following detailed description.

DETAILED DESCRIPTION OF THE PREFERRED EMBODIMENTS

A first embodiment of the present invention will hereinafter be described in detail with reference to FIGS. 1 to 3.

Figure 1:
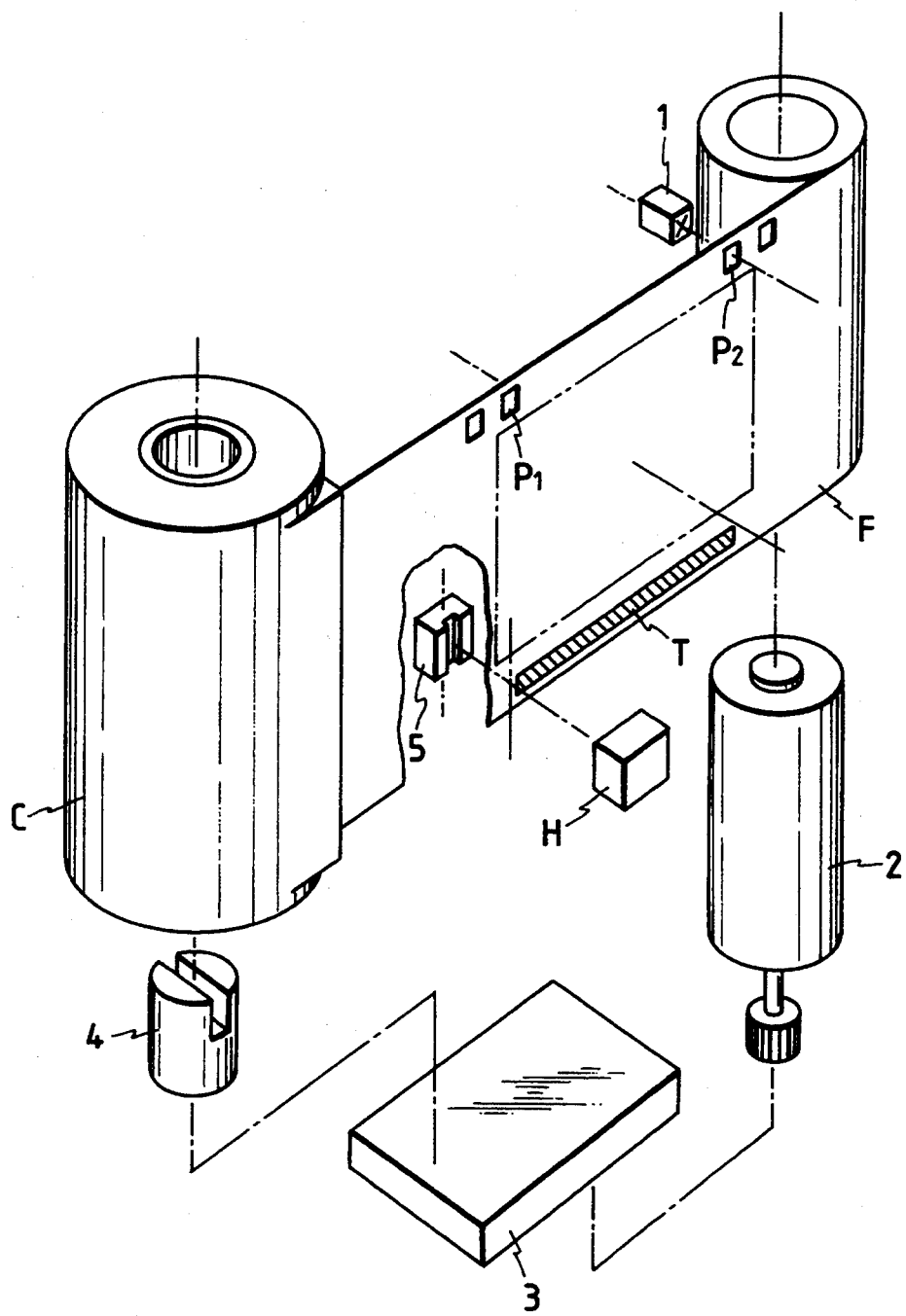
FIG. 1 is a perspective view showing the internal construction of the essential portions of a camera according to an embodiment of the present invention.

FIG. 1 is a perspective view showing the internal construction of the essential portions of a camera according to the present embodiment.

In FIG. 1, the reference numeral 1 designates a photo-reflector for detecting perforations P1 and P2 in film F which will be described later and producing a signal for indexing one frame of the film F and a signal of writing termination timing, the reference numeral 2 denotes a film feeding motor disposed in a spool, the reference numeral 3 designates a gear train for effecting deceleration and the change-over of winding and rewinding, the reference numeral 4 denotes a rewinding fork, the letter C designates a film cartridge, the letter F denotes the aforementioned film provided with a magnetic memorizing portion T on the base side thereof, P1 and P2 designate the aforementioned perforations disposed correspondingly to the photographing image field, and the letter H denotes a magnetic head for writing information into the magnetic memorizing portion T on the film F or reading out information therefrom. The reference numeral 5 designates a pad for urging the film F against the magnetic head H. The pad 5 has in the central portion thereof a recess for enhancing the intimate contact between the film F and the head gap of the magnetic head H.

Figure 2:
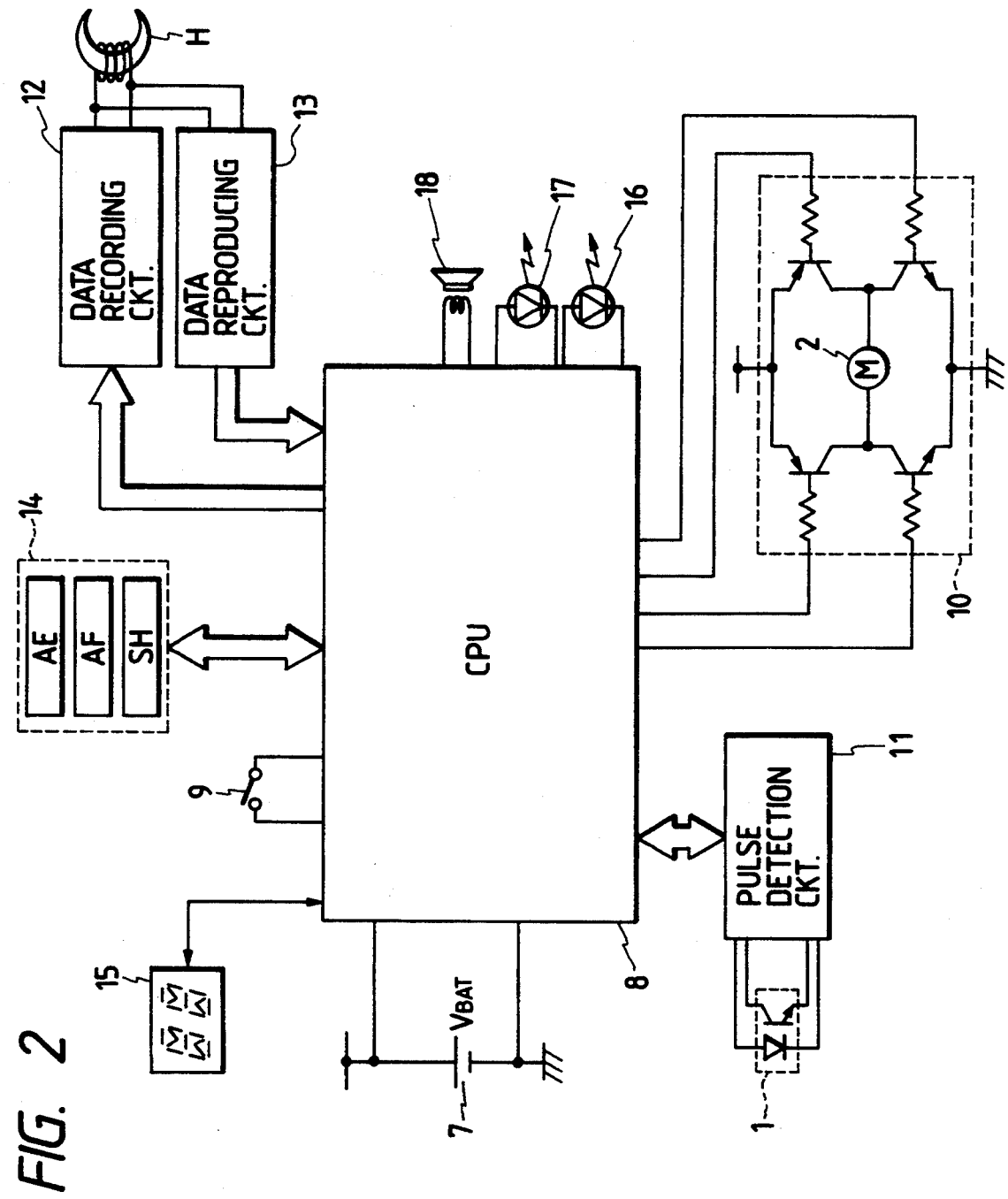
FIG. 2 is a block diagram of the essential portions of the camera of FIG. 1.

FIG. 2 is a circuit block diagram of the essential portions of the above-described camera.

In FIG. 2, the reference numeral 7 denotes the power supply battery of the camera, the reference numeral 8 designates a control circuit such as a microcomputer for controlling the various operations of the camera, the reference numeral 9 denotes a release switch for starting photographing, the reference numeral 10 designates a film feeding circuit for driving the film feeding motor 2 to effect the winding and rewinding of the film F, the reference numeral 11 denotes a pulse detection circuit for converting a perforation signal from the photo-reflector 1 into the corresponding signal of the control circuit 8, the reference numeral 12 designates a magnetic data recording circuit for driving the magnetic head H to record various kinds of data onto the magnetic memorizing portion T of the film F, the reference numeral 13 denotes a data reproducing circuit for driving the magnetic head H to read out data recorded on the magnetic memorizing portion T of the film F, the reference numeral 14 designates an AE-AF-SH circuit for effecting well-known photometry, distance measurement and shutter control, the reference numeral 15 denotes a liquid crystal indicator for indicating the number of exposed frames of the film F and effecting abnormality warning indication, the reference numerals 16 and 17 designate LEDs for effecting abnormality warning, and the reference numeral 18 denotes a buzzer for effecting abnormality warning.

Figure 3B:
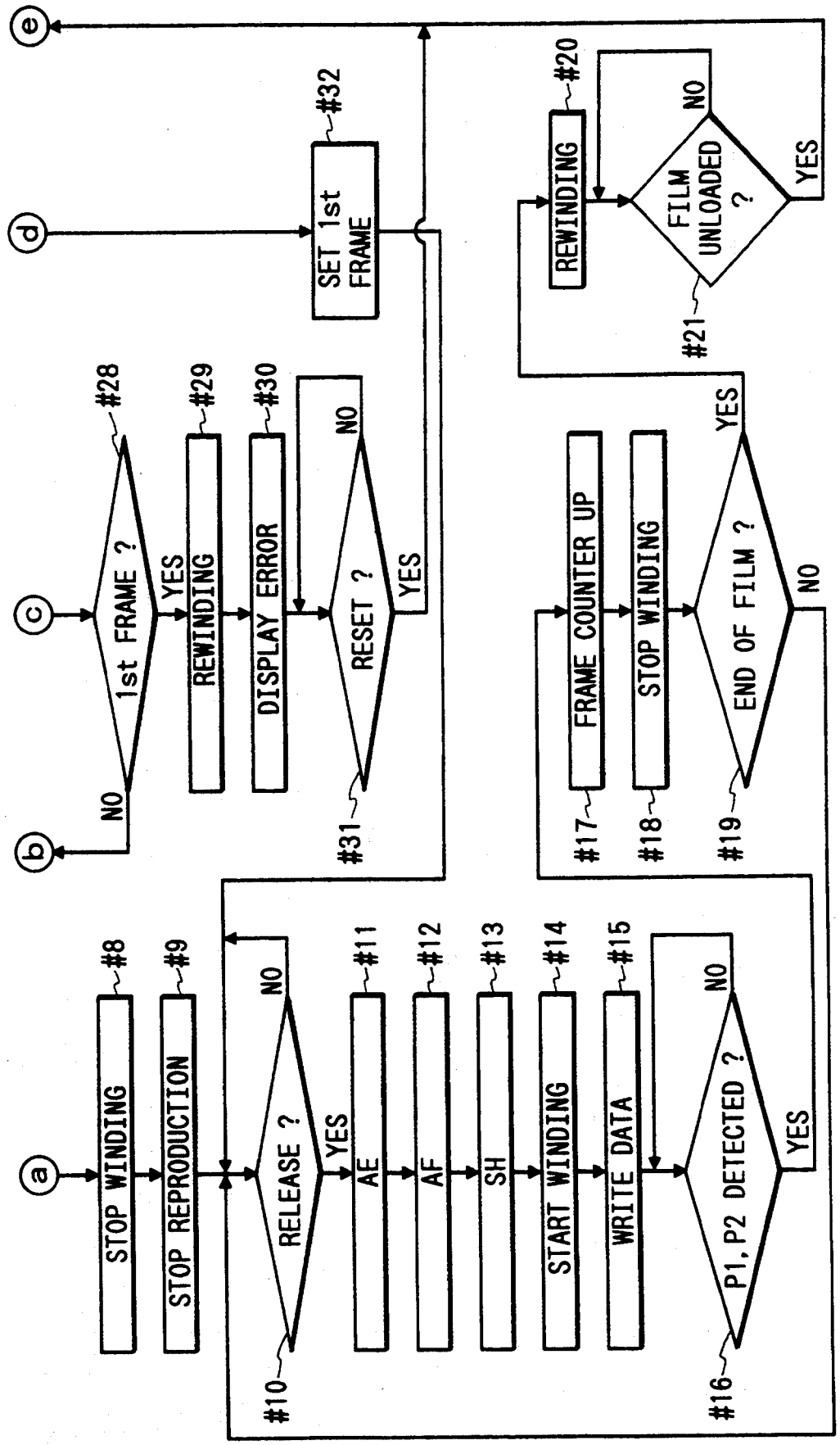
FIG. 3 is a flow chart showing the operation of the control circuit of FIG. 2.

FIG. 3 is a flow chart showing the operation of the control circuit 8, and description will hereinafter be made with reference to this figure.

[Step 1] Whether the film cartridge C has been loaded into the camera is discriminated from the state of a film presence-absence switch, not shown, and by it being discriminated that the film cartridge C has been loaded, advance is made to a step 2.

[Step 2] The film feeding motor 2 is rotated in a forward direction through the film feeding circuit 10 to thereby start the winding of the film F.

[Step 3] The magnetic head H is driven through the data reproducing circuit 13 to thereby start the reproduction of the film data pre-memorized on the magnetic memorizing portion T of the film F being wound or data such as the prescribed number of frames.

[Step 4] Whether a perforation signal corresponding to one frame has been input from the photo-reflector 1 is discriminated through the pulse detection circuit 11, and when it is discriminated that such signal has been input, advance is made to a step 5, and if such signal has not been input, advance is made to a step 6.

[Step 5] The number of frames indicated by the liquid crystal indicator 15 is counted up. The case where this count-up is effected is a case where the sequence proceeds in such a manner as step 6→22→4→5 which will be described later, and this is a case where the reproduction of the data effected during the winding of the film could not be normally effected up to a certain frame or until the last frame was reached.

[Step 6] At this step, whether the reading-out of the data has been effected by the magnetic head H during the feeding of the film (whether a magnetic signal exists) is discriminated. If as a result, the reading-out of the data has been effected, advance is made to a step 7, and if the reading-out of the data has not been effected, advance is made to a step 22.

[Step 7] The film feeding motor 2 is rotated in the forward direction through the film feeding circuit 10, and the first exposed frame or the first unexposed frame is fed to the aperture position of the camera.

[Step 8] The driving of the film feeding motor 2 is stopped through the film feeding circuit 10 to thereby stop the winding of the film F.

[Step 9] The driving of the magnetic head H is stopped through the data reproducing circuit 13 to thereby stop the reproduction of the data.

[Step 10] Whether the release switch 9 has been closed is discriminated, and by it being discriminated that the release switch has been closed, advance is made to a step 11.

[Step 11] The AE circuit 14 is driven to thereby obtain the data of the object luminance.

[Step 12] The AF circuit 14 is driven to thereby obtain the data of the object distance.

[Step 13] The SH circuit 14 is driven on the basis of the data of the object luminance and the data of the object distance obtained at the step 11 and the step 12, respectively, to thereby effect the opening-closing control of the shutter, i.e., exposure control.

[Step 14] The film feeding motor 2 is rotated in the forward direction through the film feeding circuit 10 to thereby start the winding of the exposed frame.

[Step 15] The magnetic head H is driven through the data recording circuit 12 to thereby write the date of photographing, the shutter speed, the aperture value and further the information of being exposed into the exposed frame of the film being fed.

[Step 16] Whether a perforation signal corresponding to one frame has been input from the photo-reflector 1 is discriminated through the pulse detection circuit 11, and by it being discriminated that the perforation signal has been input, advance is made to a step 17.

[Step 17] The number of frames indicated by the liquid crystal indicator 15 is counted up.

[Step 18] The driving of the film feeding motor 2 is stopped through the film feeding circuit 10 to thereby stop the winding of the film F.

[Step 19] At this step, the current number of frames is compared with the data of the prescribed number of frames introduced into unshown means for detecting the last frame of the film, and if the film ends (no frame remains), advance is made to a step 20, and if the film does not end, return is made to the step 10.

[Step 20] The film feeding motor 2 is rotated in the reverse direction through the film feeding circuit 10 to thereby effect the rewinding of the film F.

[Step 21] Whether the film cartridge C has been removed out of the camera is discriminated from the state of the film presence-absence switch, not shown, and by it being discriminated that the film cartridge has been removed, return is made to the step 1.

If the reproduction of the data cannot be effected by the step 6, advance is made to a step 22, as described previously.

[Step 22] At this step, whether the last frame has been reached is discriminated by the comparison with the prescribed number of frames, and if the last frame is not yet reached, return is made to the step 4, and by it being discriminated that the last frame has been reached, advance is made to a step 23.

[Step 23] The rotation of the film feeding motor 2 is reversed through the film feeding circuit 10 to thereby start the rewinding of the film F.

[Step 24] The magnetic head H is driven through the data reproducing circuit 13, whereby the reproduction of the data such film data and the prescribed number of frames pre-memorized in the magnetic memorizing portion T of the film F being rewound is started again.

[Step 25] Whether a perforation signal corresponding to one frame has been input from the photo-reflector 1 is discriminated through the pulse detection circuit 11 as at the step 4, etc., and if the perforation signal is not yet input, advance is made to a step 27, and by it being discriminated that the perforation signal has been input, advance is made to a step 26 via steps 28, 24 and 25.

[Step 26] The number of frames indicated by the liquid crystal indicator 15 is counted down.

[Step 27] At this step, as at the step 6, whether the reading-out of the data has been effected by the magnetic head H during the feeding of the film (whether a magnetic signal exists) is discriminated. If as a result, the reading-out of the data has been effected, advance is made to a step 32, and if also at this step, the reading-out of the data is not effected, advance is made to a step 28.

[Step 28] Whether the rewinding of the film F up to the first frame (the first exposed frame) has been terminated is discriminated, and if it is not yet terminated, return is made to the step 25. Also, by it being discriminated that the rewinding has been terminated, advance is made to a step 29 with it being understood that the reproduction of the data could not be effected even if the direction of feeding of the film F was changed.

[Step 29] The rewinding of the film F is continued, and when all the film F is contained in the film cartridge C, advance is made to a step 30.

[Step 30] At this step, abnormality warning is effected by the liquid crystal indicator 15, LEDs 16, 17 and the buzzer 18. That is, the error that the reproduction of the data could not be effected is displayed.

[Step 31] Whether the battery 7 which is the power source has been removed out of the camera is discriminated, and by the battery being removed, the error state is released. It is discriminated that the battery 7 has been loaded again into the camera, whereby return is made to the step 1.

If at the step 27, it is discriminated that the reproduction of the data could be effected, advance is made to a step 32 as described previously.

[Step 32] At this step, it is judged that by the data reproducing operation having been performed with the direction of feeding of the film F changed, the surface of the film F which contacts with the magnetic head H changed delicately and the data could be reproduced, and the rotation of the film feeding motor 2 is reversed through the film feeding circuit 10, and the first exposed frame or the first unexposed frame is fed to the aperture position of the camera.

Figure 4:
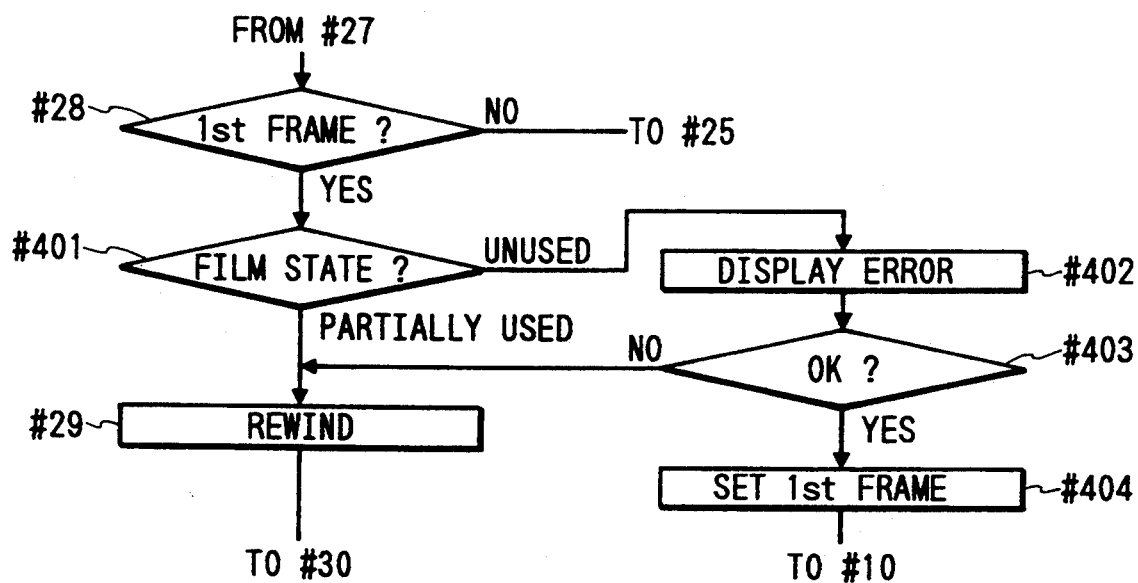
FIG. 4 is a flow chart showing the operations of essential portions in the second embodiment of the present invention.
Figure 5:
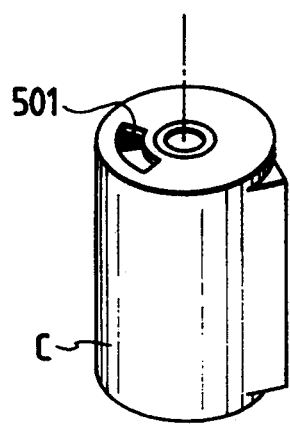
FIG. 5 is a perspective view showing a film cartridge used in a second embodiment of the present invention.

FIGS. 4 and 5 show a second embodiment of the present invention, FIG. 4 being a flow chart of the essential portions, and FIG. 5 being a perspective view showing a film cartridge C used in this embodiment.

The film cartridge C used in this embodiment, as shown in FIG. 5, is provided with a display portion 501 which displays the states of use of film, and the black portion in FIG. 5 is adapted to slide so as to display the "unused", "partially used" and "used" states of the film F by the positions of the black portions. The camera in this embodiment is designed such that the position of the black portion of the display portion 501 is detected by a photo-reflector, not shown, whereby the state of use of the film F can be known.

In the flow chart of FIG. 4, there are shown only the operations of portions differing from those of FIG. 3, and the same step numbers as those in FIG. 3 are functionally similar portions.

When at the step 28, it is discriminated that the first frame of the film F has been rewound to the aperture position, advance is made to a step 401, where the state of use of the film is discriminated from the black portion of the display portion 501. If as a result, the film is "partially used", advance is made to the step 29, where as described previously, the rewinding of the film is continued until the leader portion of the film is rewound into the film cartridge C.

On the other hand, if the film is "unused", advance is made to a step 402, where abnormality warning is effected by the liquid crystal indicator 15, LEDs 16, 17 and the buzzer 18. Advance is then made to a step 403, to discriminate whether the will to photograph has been expressed in spite of the above-mentioned abnormality warning having been effected, that is, whether it is desired to continue photographing even if the recording of the photographing data by the magnetic head H is not effected, from a switch input, not shown, and if it is discriminated that the will to photograph has been expressed, advance is made to a step 404, where the rotation of the film feeding motor 2 is reversed through the film feeding circuit 10, whereby the first exposed frame or the first unexposed frame is fed to the aperture position of the camera, and then the operations of the aforedescribed step 10 and subsequent steps are performed. If the will to photograph has not been expressed, advance is made to the step 29 and subsequent steps, thus terminating the photographing operation.

Figure 6:
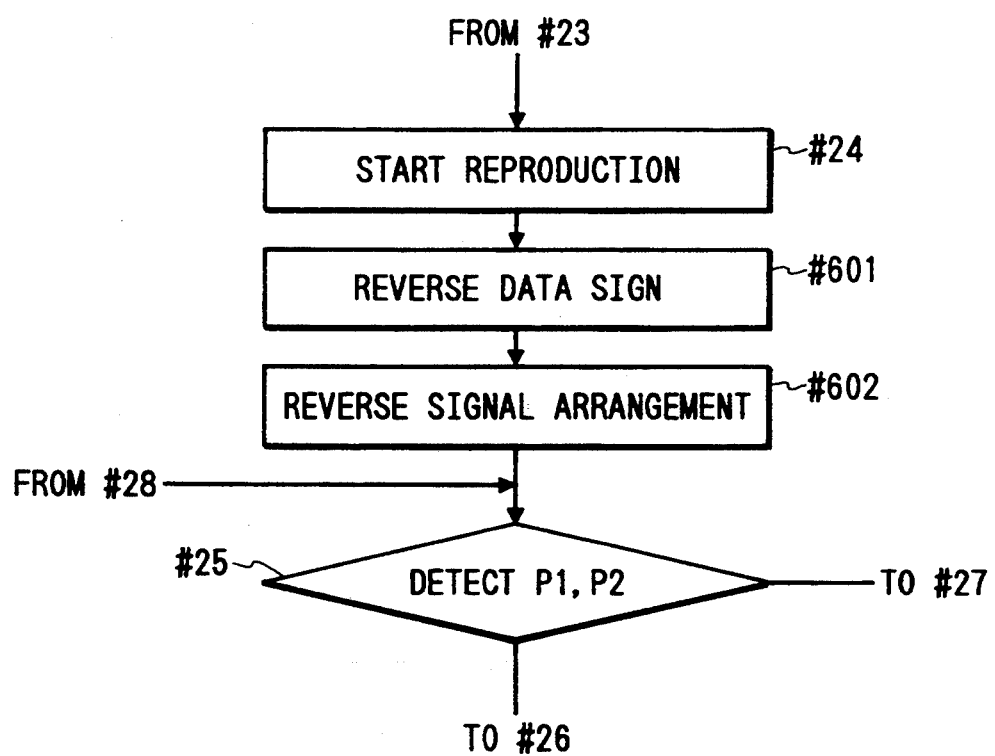
FIG. 6 is a flow chart showing the operations of essential portions in a third embodiment of the present invention.

FIG. 6 shows the operations of the essential portions of a third embodiment of the present invention, and again in this embodiment, only the operations of portions differing from those in FIG. 3 are shown.

In this embodiment, steps 601 and 602 for performing operations which will be described below are inserted between the steps 24 and 25 in the first embodiment shown in FIG. 3.

At the step 601, the direction of feeding of the film F is changed and therefore, the sign (plus or minus) of the reproduction signal read out by the magnetic head H is reversed. In order to prevent this, at this step, the characteristic of the data reproducing circuit 13 is changed over so that the sign of said signal may not be reversed. Then, at a step 602, the arrangement of the bits of said signal is reversed. For example, assuming that a signal "10001111" is read out during the rewinding of the film, if the data reproducing operation is performed with the direction of feeding of the film changed in this manner, the signal is read out in the order of bits "11110001" and therefore, this arrangement is reversed to provide a regular signal. Then, advance is made to the aforedescribed step 25.

According to each of the above-described embodiments, if the reproduction of the data could not be effected during the rewinding of the film, in order to delicately change the surface of the film F which contacts with the magnetic head H, the rewinding of the film is started after the winding of the film up to the last frame has been effected, and at this time, the reproduction of the data is effected again and therefore, the possibility of the reproduction of the data being effected is enhanced very much and the waste of the film is reduced.

Also, as in the second embodiment, design is made such that even when the reproduction of the data could not be effected, the photographing onto the film F at this time is made possible and therefore, the camera becomes strong for shutter chance. Also, even in such a case, the waste of the film is reduced.

Also, as in the third embodiment, design is made such that the sign and the arrangement of the bits of the reproduction signal are reversed and therefore, even in the reproduction of the data is effected during the feeding of the film in the reverse direction, accurate data can be obtained, and when it is necessary to use this data, the camera becomes very advantageous.

As described above, according to the above-described embodiments, provision is made of discrimination means for discriminating whether the data are reproduced by the magnetic head, and control means for reversing the direction of feeding of the film by film feeding means when it is discriminated by said discrimination means that the reproduction of the data is not effected even if the last frame of the film is detected by last frame detecting means, and instructing the magnetic head to reproduce the data in the reversed direction of feeding, and when in the data reproduction during the winding of the film, it is discriminated that the reproduction of the data is not effected even if the last frame of the film is detected, the direction of feeding of the film is changed to the direction of rewinding of the film in order to delicately change the surface of the film which contacts with the magnetic head of the camera, thereby effecting the reproduction of the same data again. Consequently, the impossibility of effecting the reproduction of the magnetic data recorded on the film can be greatly reduced and the waste of the film can be reduced.

Figure 7:
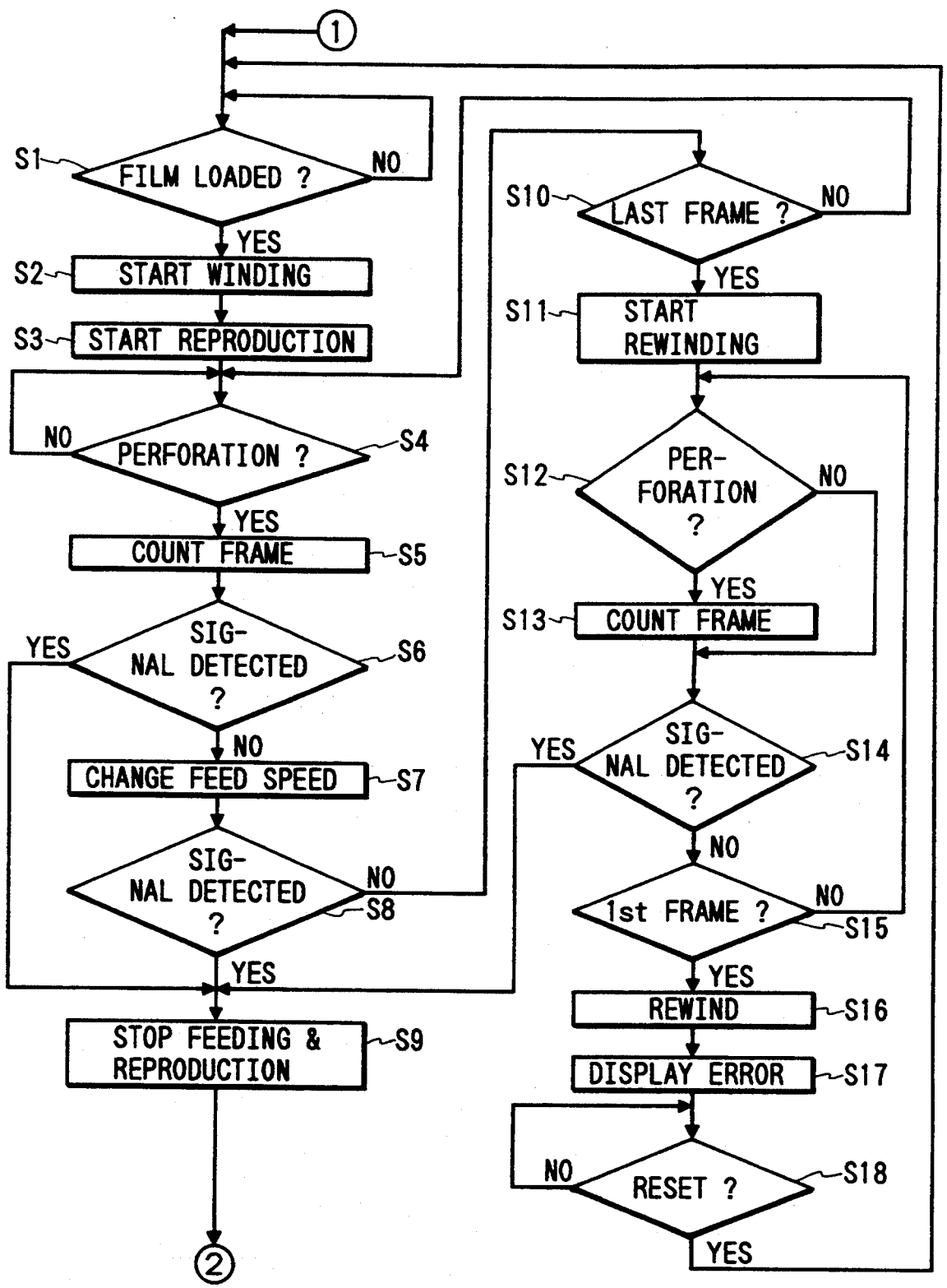
FIG. 7 is a flow chart showing the operation of a fourth embodiment of the present invention.
Figure 8:
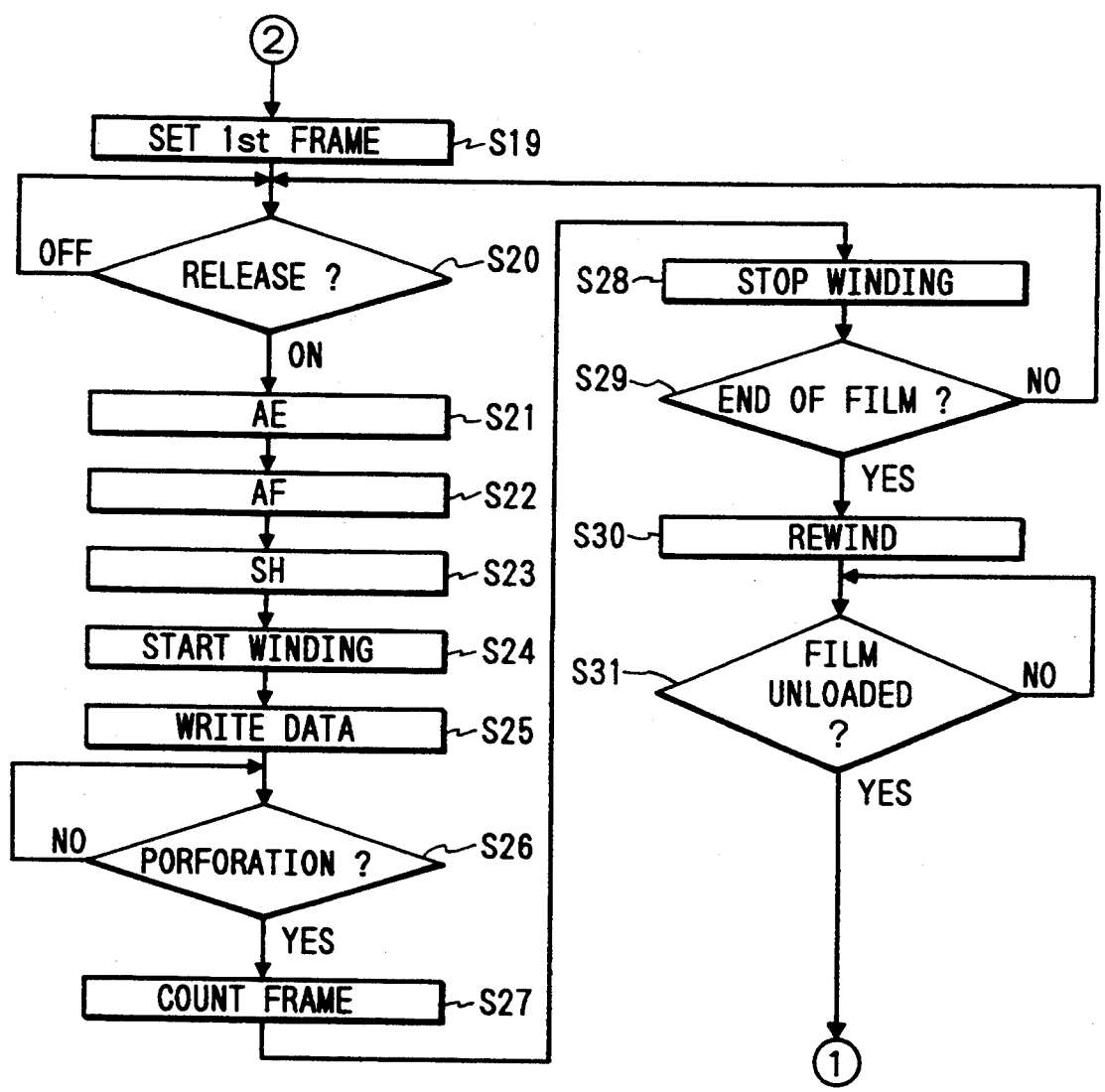
FIG. 8 is a flow chart showing the processes subsequent to FIG. 7.

FIGS. 7 and 8 are flow charts showing the operation of a fourth embodiment of the present invention. FIG. 8 shows the processes subsequent to FIG. 7. In these figures, the letter S means steps.

Whether the film F has been loaded into the camera is first confirmed by a film presence-absence switch (not shown) (S1), and if the film F is loaded, the feeding motor 2 is rotated in the forward direction to thereby start the winding of the film (S2). The reproduction of the magnetic data recorded in the magnetic recording portion T of the film F is then started by the magnetic head H and the data reproducing circuit 13 (S3). Thereafter, perforations P1 and P2 are detected by the photo-reflector 1 (S4), and when the prescribed number of perforations for one frame has come, the frame counting process is carried out (S5). In this process, the frame number being displayed by the LCD 15 is counted up, whereafter shift is made to the next process (S6). At the step S6, whether the magnetic data have been read out by the data reproducing circuit 13 is discriminated, and if said data have been read out (the case of Y), shift is made to a step S9, and if said data have not been read out (the case of N), shift is made to a step S7.

At the step S7, the feed speed of the feeding circuit 10 is changed because this step means that one frame has been fed, but no signal has been detected. As a method of changing the feed speed, there is, for example, a duty-driving method of changing the width of a pulse, or a method of controlling the base voltage of an NPN transistor on a bridge. When the feed speed changing process is terminated, whether the magnetic data have been read out by the data reproducing circuit 13 is discriminated again (S8), and if the magnetic data have been read out (the case of Y), shift is made to a step S9, and if the magnetic data have not been read out (the case of N), shift is made to a step S10.

At the step S9, the feeding motor 2 is stopped to thereby stop the winding of the film F and stop the reproduction of the magnetic data by the magnetic head H and the data reproducing circuit 13. When the process of the step S9 is terminated, feeding is effected so as to set the first frame to be exposed (S19). The ON/OFF of the release switch 9 is then detected (S20), and if the ON of the release switch is detected, AE control (S21), AF control (S22) and SH control (S23) are executed in succession to thereby perform photometry, distance measurement and exposure operation. Thereafter, the winding of the film F is started (S24), and further, the writing of the magnetic data into the magnetic recording portion on the film F is effected by the use of the magnetic head H and the magnetic data recording circuit 12 (S25). Thereafter, the detection of the perforations is effected (S26), and if a prescribed number of perforations corresponding to one frame is detected, the frame number is counted up (S27), and then the winding of the film F is stopped (S28).

Further, the current frame number is compared with the maximum frame number magnetically recorded on the magnetic recording portion (S29), and if the current frame number is smaller than the maximum frame number, shift is made to a step S20, and if the current frame number is greater than the maximum frame number, shift is made to a step S30. The process at the step S30 is to rotate the feeding motor 2 in the rewinding direction to thereby rewind the film, and after the motor 2 is stopped with the completion of the rewinding, the state of the film presence-absence switch is detected (S31), and if the film F is removed, shift is made to the step S1.

The processes of steps S10–S18 will now be described. If as the result of the judgment by the step S8, the magnetic data have not been read out, whether the current frame is the last frame is judged on the basis of the result of the detection of the perforation (not shown) for the detection of the last frame (S10), and if the current frame is not the last frame, shift is made to the step S4, and if the current frame is the last frame, the film is rewound in the opposite direction (S11). The perforations P1 and P2 are then detected by the photo-reflector 1 for feeding (S12), and if a prescribed number of perforations corresponding to one frame has come, the frame number being displayed by the LCD 15 is counted down (S13). After the termination of this process and if no perforation is detected, whether the magnetic data have been read out by the magnetic reproducing circuit 13 is judged (S14), and if the magnetic data have been read out (the case of Y), the direction of feeding is changed and the feeding and reproduction are stopped, whereafter shift is made to a step S19. On the other hand, if the magnetic data have not been read out at the step S14, whether the current frame is the first frame is judged (S15), and if the current frame is not the first frame, return is made to the step S12, and if the current frame is the first frame, the rewinding of the film F into the film cartridge C is effected (S16). After the termination of this rewinding, the error display by the LCD 15 and the LEDs 16, 17 and the warning by the buzzer 18 are effected (S17). Further, whether the battery 7 has been removed is judged (S18), and if the battery has been removed, the error state is released, whereafter shift is made to the step S1. As regards the error releasing process (S15), the removal of the battery 7 is included in the flow chart, but if the battery 7 is removed and thereafter is mounted again, start is made from the step S1.

Figure 9:
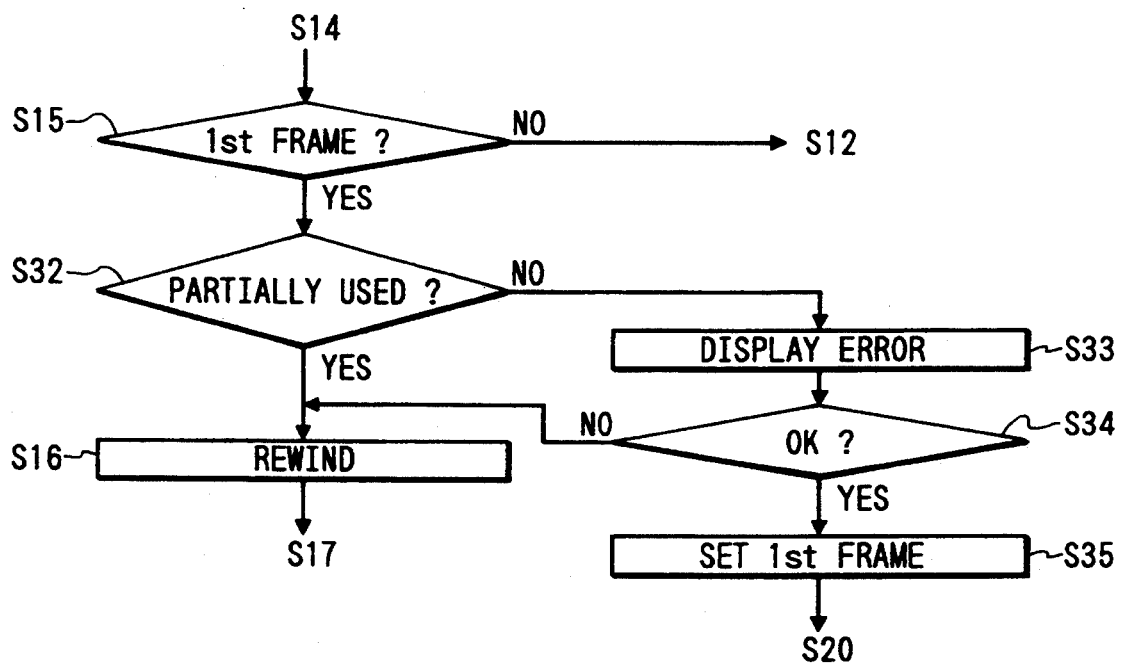
FIG. 9 is a flow chart showing another example of the process of the present invention.

FIG. 9 is a flow chart showing a fifth embodiment of the present invention. In FIG. 9, only portions differing from those in the flow chart of FIG. 7 are shown. Also, in FIG. 9, the same portions as those in FIG. 7 are given the same step numbers and need not be described.

In this embodiment, as shown in FIG. 5, the film cartridge C is provided with display means 501 for displaying the situations of use of the film F. This display means 501 is such that the black portion thereof slides to right and left and the unused, partially used and used states of the film F can be displayed by the positions of the black portion. The camera can know the states of use of the film F by detecting the positions of the black portion of the display means 501.

The processes of FIG. 9 will now be described.

When at a step S15, the first frame is judged, the display means 501 for displaying the situations of use of the film which is shown in FIG. 5 is detected by a photo-reflector (not shown) or the like, and whether the film is partially used is discriminated (S32). If it is judged that the film is partially used, the film F is rewound (S16), and on the other hand, if the film is unused, the camera effects the error display that the magnetic circuit (the magnetic head H and the data reproducing circuit 13) of the camera is out of order, by the use of the LCD 15 shown in FIG. 2 (S33). Then, in response to this error display, whether photographing which does not use the magnetic circuit, i.e., the recording of the photographing data onto the film, need not be effected is judged (S34), and if it need not be effected, it is regarded as "OK" and advance is made to the next step, where the first frame to be exposed is set (S35) to bring about a photographable state, and advance is made to a step S20. If at the step S34, the judgment is not "OK", photographing is prohibited (S16).

Figure 10:
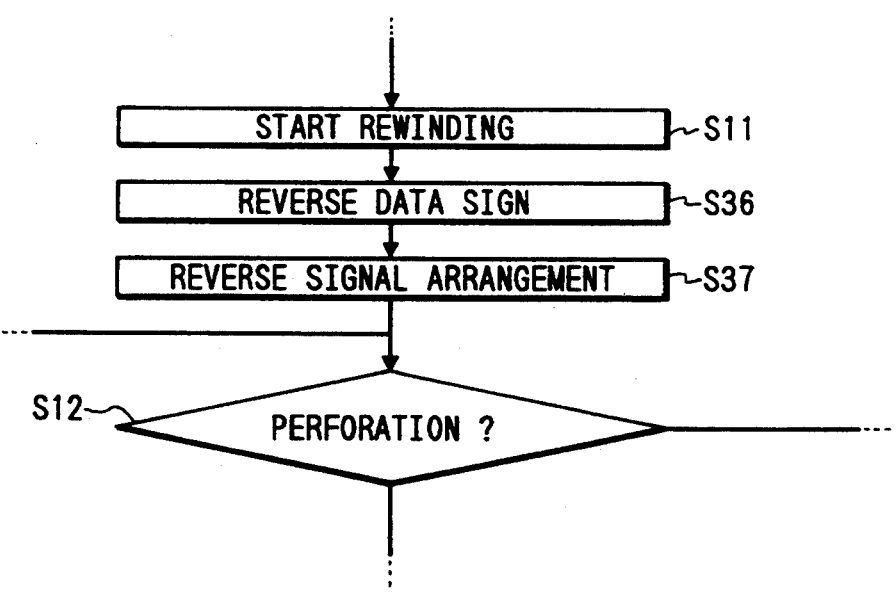
FIG. 10 is a flow chart showing a fifth embodiment of the present invention.

FIG. 10 is a flow chart showing a sixth embodiment of the present invention. In FIG. 10, only portions differing from those in the flow chart of FIG. 7 are shown. Also, in FIG. 10, the same portions as those in FIG. 7 are given the same step numbers and need not be described.

In the present embodiment, steps S36 and S37 are added between steps S11 and S12, and the data reproducing circuit 13 is set so that the direction of feeding of the film F may be reversed by rewinding (S11) and further the positive/negative reversal (S36) of the signal reproduced by the magnetic head H may be changed, and for the order of the bits of the obtained magnetic signal to become opposite, the arrangement of signals is reversed (S37). Thereafter, the process shifts to the step S12.

Figure 11:
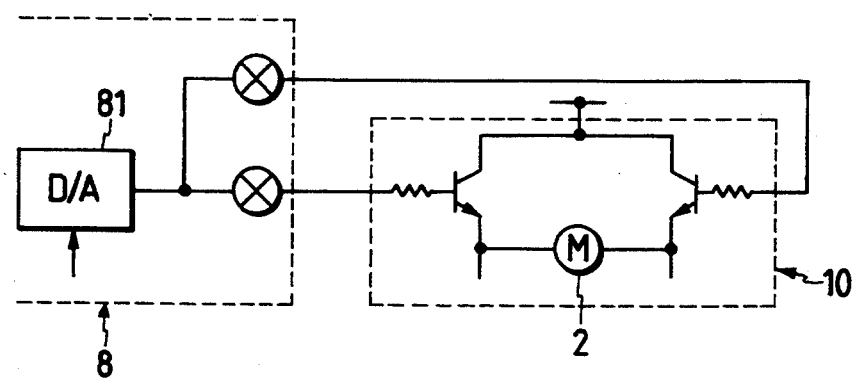
FIG. 11 is a circuit diagram showing a first example of the circuit for effecting the feeding speed change shown in FIG. 7.
Figure 12:
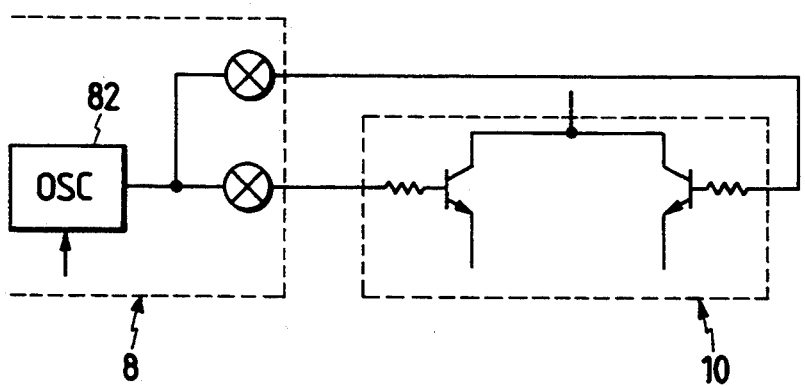
FIG. 12 is a circuit diagram showing the first example of the circuit for effecting the feeding speed change shown in FIG. 7.

FIGS. 11 and 12 are circuit diagrams showing two examples of a circuit for effecting the change of the feed speed shown at the step S5 of FIG. 7.

In the construction of FIG. 11, the CPU 8 is provided with a digital/analog (D/A) converter 81 and the power transistor of the feeding circuit 10 is controlled by the switching operation of the D/A converter 81. The construction of FIG. 12 is an example of duty driving, in which the oscillation frequency of an oscillator (OSC) 82 contained in the CPU 8 is controlled to thereby control the motor 2 in the feeding circuit 10.

As described above, according to the fourth to sixth embodiments, in a camera adapted to be loaded with film provided with a magnetic recording portion, provision is made of judging means for judging whether recorded data in said magnetic recording portion can be reproduced, and control means for changing the feed speed of said film and effecting the reproduction of said recorded data again when reproduction could not be effected by said judging means and therefore, the accident by the impossibility of reproduction can be mitigated and an optimal feed speed can be obtained for azimuth, off-track, skip, etc.

Figure 13:
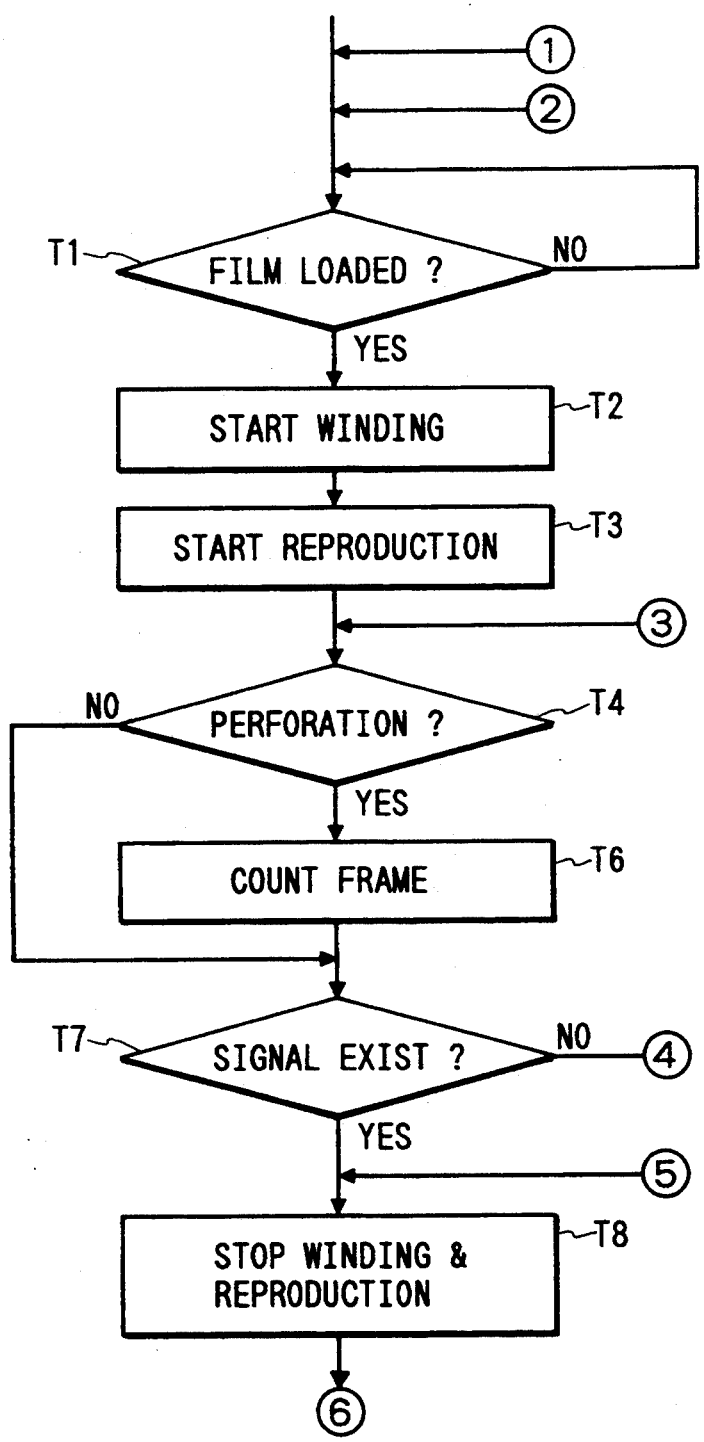
FIG. 13 is a flow chart showing the operation of a seventh embodiment of the present invention.
Figure 14:
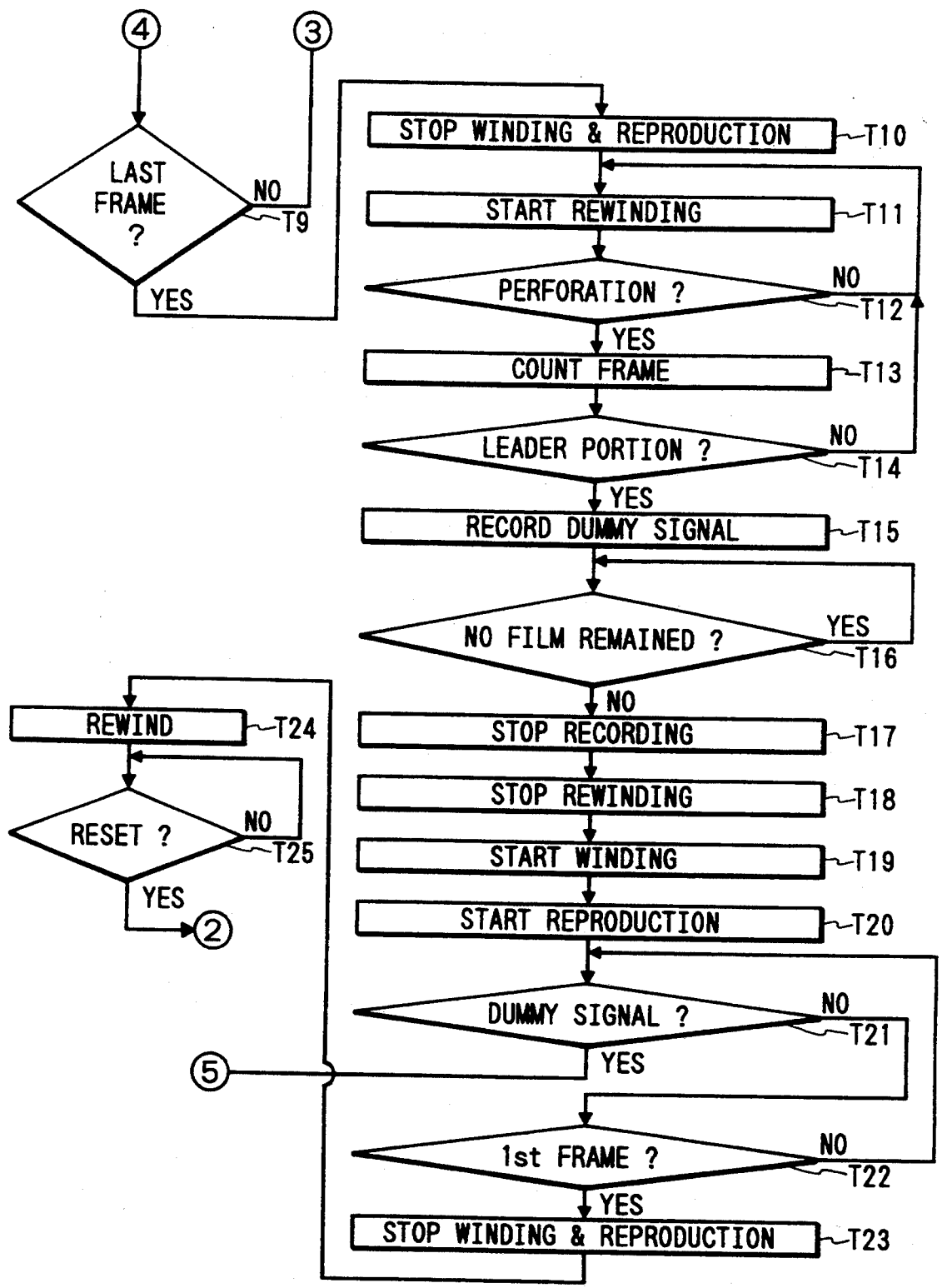
FIG. 14 is a flow chart showing the processes subsequent to FIG. 13.
Figure 15:
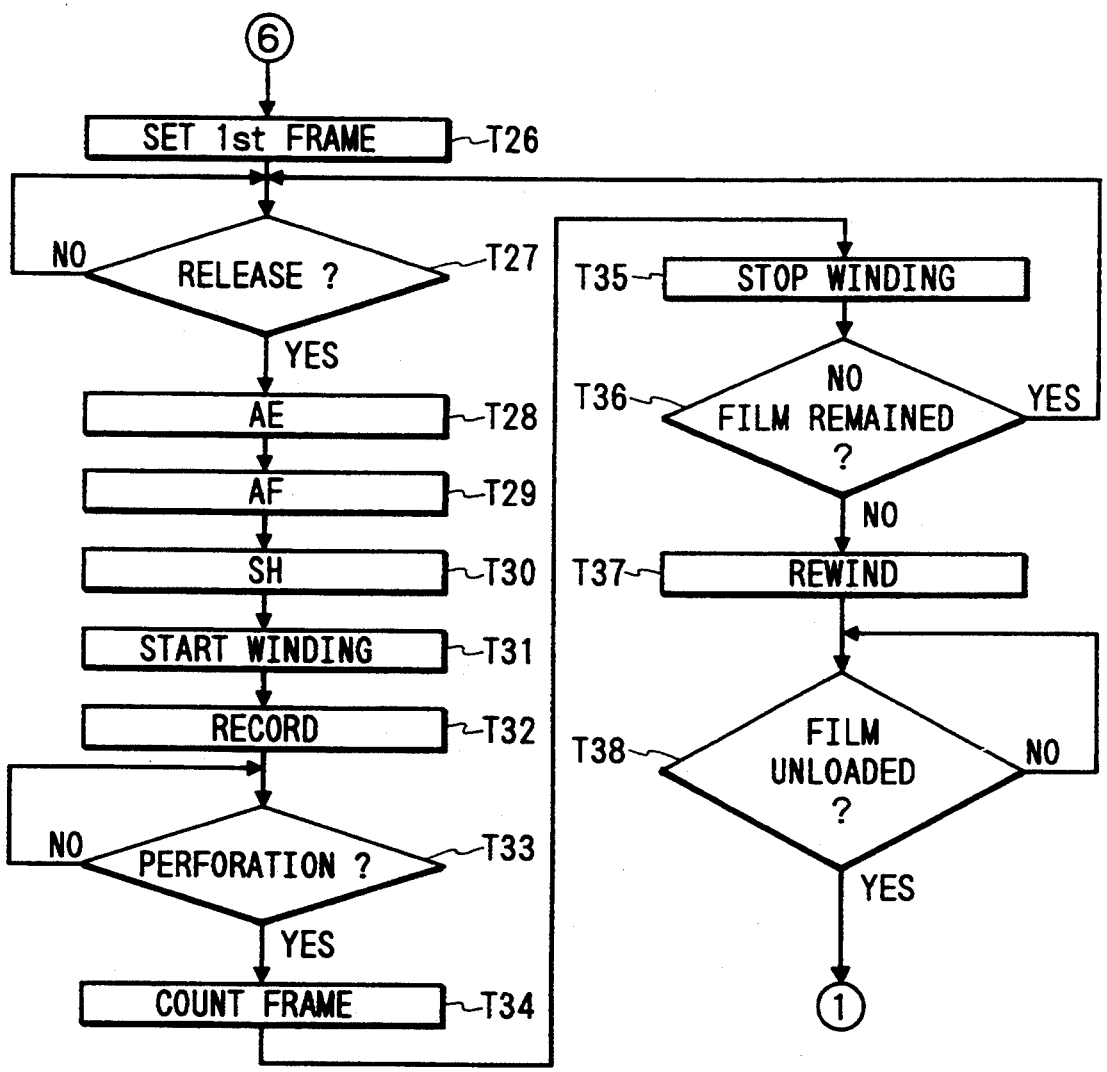
FIG. 15 is a flow chart showing the processes subsequent to FIG. 13.

FIGS. 13, 14 and 15 are flow charts showing the operation of a seventh embodiment of the present invention. FIGS. 14 and 15 show the processes subsequent to FIG. 13. In these figures, the letter T means steps.

Whether the film F has been loaded into the camera is first confirmed by a film presence-absence switch (not shown) (T1), and if the film F is loaded into the camera, the feeding motor 2 is rotated in the forward direction to thereby start the winding of the film (T2). The reproduction of the magnetic data recorded in the magnetic recording portion T of the film F is then started by the magnetic head H and the data reproducing circuit 13 (T3). Thereafter, perforations P1 and P2 are detected by the photo-reflector 1 (T4), and when a prescribed number of perforations corresponding to one frame has come, the frame counting process is carried out (T6). If the perforations are not detected, shift is made to a step T7.

The process of the step T6 is such that the frame number displayed by the LCD 15 is counted up, and thereafter, shift is made to the next process (T7). At the step T7, whether the magnetic data have been read out by the data reproducing circuit 13 is judged, and if the magnetic data have been read out (the case of Y), shift is made to the next step (T8), and if the magnetic data have not been read out (the case of N), shift is made to the next step (T9).

At the step T8, the feeding motor 2 is stopped to thereby stop the winding of the film F and stop the reproduction of the magnetic data by the magnetic head H and the data reproducing circuit 13. When the process of the step T8 is terminated, feeding is effected so as to set the first frame to be exposed (T26). The ON/OFF of the release switch 9 is then detected (T27), and if the release switch is closed, AE control (T28), AF control (T29) and SH control (T30) are executed in succession, whereby photometry, distance measurement and exposure operation are performed. Thereafter, the winding of the film F is started (T31), and further, the writing of the magnetic data into the magnetic recording portion T of the film F is effected by the use of the magnetic head H and the data recording circuit 12 (T32). Thereafter, the detection of perforations is effected (T33), and if a prescribed number of perforations corresponding to one frame is detected, the frame number is counted up (T34), and then the winding of the film F is stopped (T35).

Further, the current frame number is compared with the maximum frame number magnetically recorded in the magnetic recording portion T (T36), and if the current frame number is smaller than the maximum frame number, shift is made to a step T27, and if the current frame number is equal to the maximum frame number, shift is made to a step T37. The process of the step T37 is such that the feeding motor 2 is rotated in the rewinding direction to thereby rewind the film, and if after the motor 2 is stopped with the termination of the rewinding, the state of the film presence-absence switch is detected (T38) and the film F is taken out, shift is made to the step T1.

The processes of steps T10–T25 will now be described. If as the result of the judgment at the step T7, the magnetic data have not been read out, whether the current frame is the last frame is judged on the basis of the result of the detection of the perforation for the detection of the last frame (not shown) (T9), and if the current frame is not the last frame, shift is made to the step T4, and if the current frame is the last frame, winding is stopped and reproduction is also stopped (T10). Rewinding is then started (T11). This feeding is effected so that the leader portion of the film on which dummy magnetic recording to be described is done may come to the position of the magnetic head so as not to affect the exposed frames of the film F. Subsequently, as at T4, the perforations are detected (T12) and the frame number is subtracted (T13), and the leader portion of the film is detected from the frame count value (T14). If the detected portion is not the leader portion, return is made to T11, and if the detected portion is the leader portion, advance is made to T15. In this state, the magnetic recording of a dummy signal is started while the leader portion is fed (T15). The end of the film is judged by the photo-reflector 1 for detecting perforations (T16), and when the film is taken up, advance is made to T17, and recording is stopped and rewinding is stopped (T18). Then, the winding of the leader portion of the film is again started to reproduce the signal recorded by the dummy signal (T19), whereby the signal by the dummy signal is magnetically reproduced (T20). Further, whether the reproduced signal (the dummy signal) could be reproduced is judged (T21), and if the dummy signal cannot be reproduced up to the first frame (T22), it is judged that the magnetic circuit of the camera is out of order, and the winding of the film F is stopped and the reproduction is stopped (T23). At T24, the rewinding of the film is effected to thereby rewind the film into the cartridge, whereafter whether the battery 7 has been removed is judged, and if the battery has been removed and the magnetic circuit of the camera has been repaired, the error state is released (T25), whereafter shift is made to the step T1. On the other hand, if at T21, the dummy signal could be reproduced, it is judged that the camera is capable; of effecting magnetic recording, and advance is made to a step T8, where the ordinary photographing sequence is entered.

The error releasing process (T25) includes the removal of the battery 7 in the flow chart, but if the battery 7 has once been removed and then has been mounted into the camera, start is made from the step T1.

Figure 16:
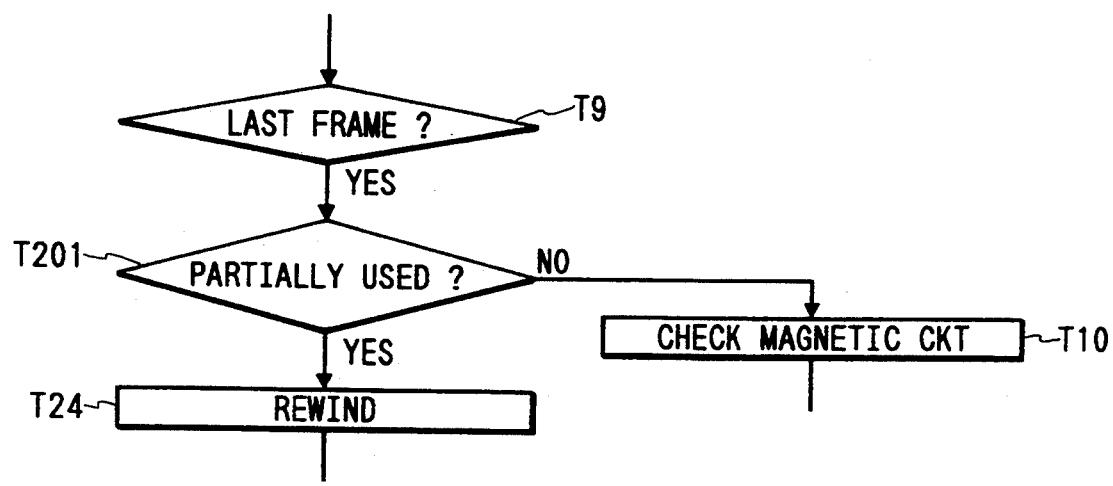
FIG. 16 is a flow chart showing an eighth embodiment of the present invention.
Figure 17:
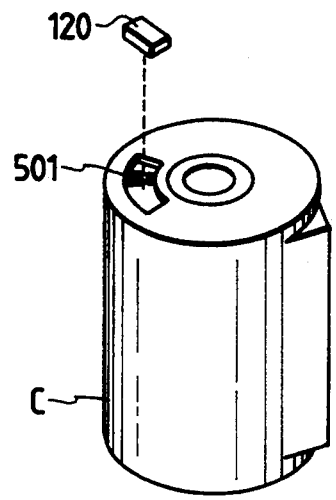
FIG. 17 is a perspective view showing another example of the film cartridge.

FIG. 16 is a flow chart showing an eighth embodiment of the present invention, and FIG. 17 is a perspective view showing another example of the film cartridge.

In this embodiment, the film cartridge C is provided with means 501 for displaying the situation of use of the film F, as shown in FIG. 17. This means 501 for displaying the situation of use of the film is designed such that the black portion thereof slides to right and left and that the unused, partially used and used states of the film F can be displayed by the positions of the black portion. The reference numeral 120 designates a photointerrupter which, like the photointerrupter 1, is connected to the CPU 8. The camera can know the state of use of the film F by detecting the position of the black portion of the means 501 by the photointerrupter 120.

In FIG. 16, only portions differing from those in the flow charts of FIGS. 13 and 14 are shown. Also, in FIG. 16, the same portions as those in FIGS. 13 and 14 are given the same step numbers and need not be described. If at a step T9, the signal cannot be reproduced up to the last frame, the display of the situation of use of the film is detected (T201), and if the film is unused film, the operation of the magnetic circuit of the camera is checked up (T10). If the result of the judgment by a step T201 is a partially used cartridge, the detection of used frames cannot be discriminated because such frames cannot be magnetically reproduced and therefore, the check-up of the operation of the magnetic circuit is not effected, but the rewinding of the film F is effected (step T24).

Figure 18:
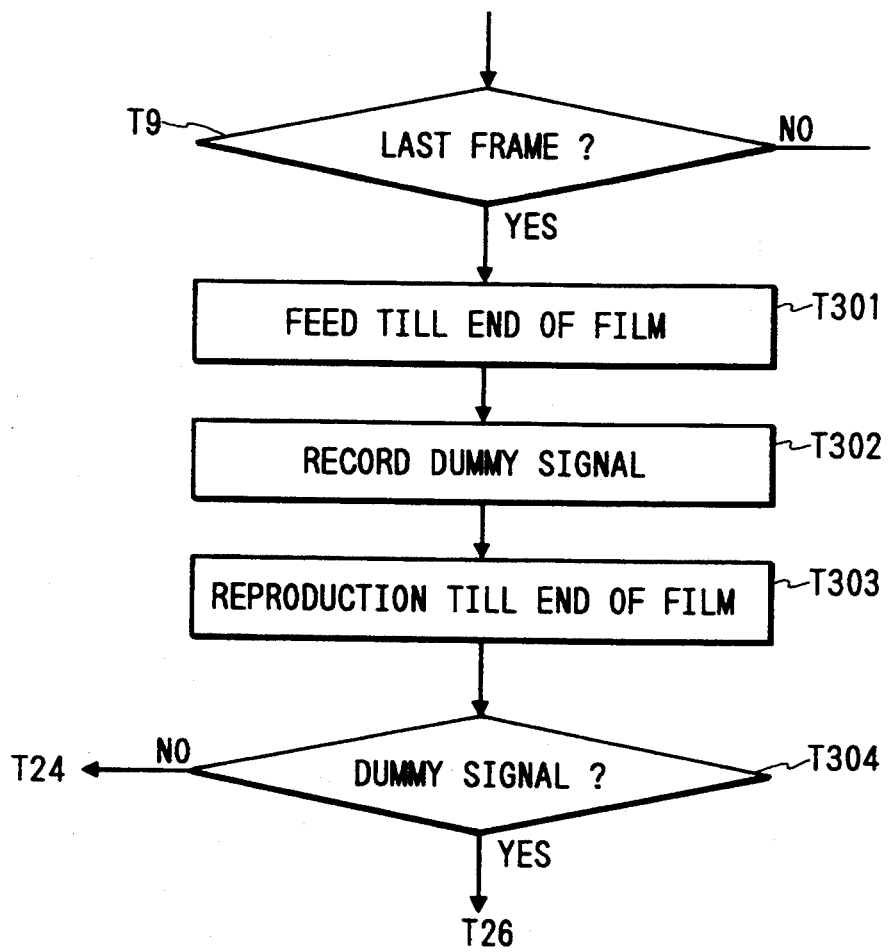
FIG. 18 is a flow chart showing a ninth embodiment of the present invention.

FIG. 18 is a flow chart showing a ninth embodiment of the present invention. Again in FIG. 18, only portions differing from those in the flow charts of FIGS. 13 and 14 are shown and the same portions as those in FIGS. 13 and 14 are given the same step numbers.

In the processes of FIGS. 13 and 14, it has been described that the check-up of the magnetic circuit is effected by the film leader portion, while in FIG. 18, design is made such that the check-up of the magnetic circuit is effected by that portion of the film which has been left after the prescribed number of exposed frames of the film F which is nearest to the spool of the cartridge is terminated. That is, if the last frame is judged at a step T9, feeding is effected up to the end portion of the film (T301) and the magnetic recording of a dummy signal is effected (T303). This recorded dummy signal is then reproduced while the film is rewound (T303), and whether the dummy signal has been reproduced is judged (T304).

As described above, according to the seventh to ninth embodiments, in a camera adapted to be loaded with film having a magnetic recording portion, provision is made of discrimination means for discriminating whether the recorded data on the magnetic recording portion can be reproduced, recording means for recording a dummy signal on the magnetic recording portion when reproduction could not be effected by said discrimination means, and judging means for judging the trouble of the camera by reproducing the dummy signal recorded by said recording means and therefore, either the abnormality of the film or the trouble of the camera can be known reliably. Also, the fact that recording has been effected can be confirmed even when reproduction cannot be effected because of the camera's own azimuth error or off-track.

Figure 19:
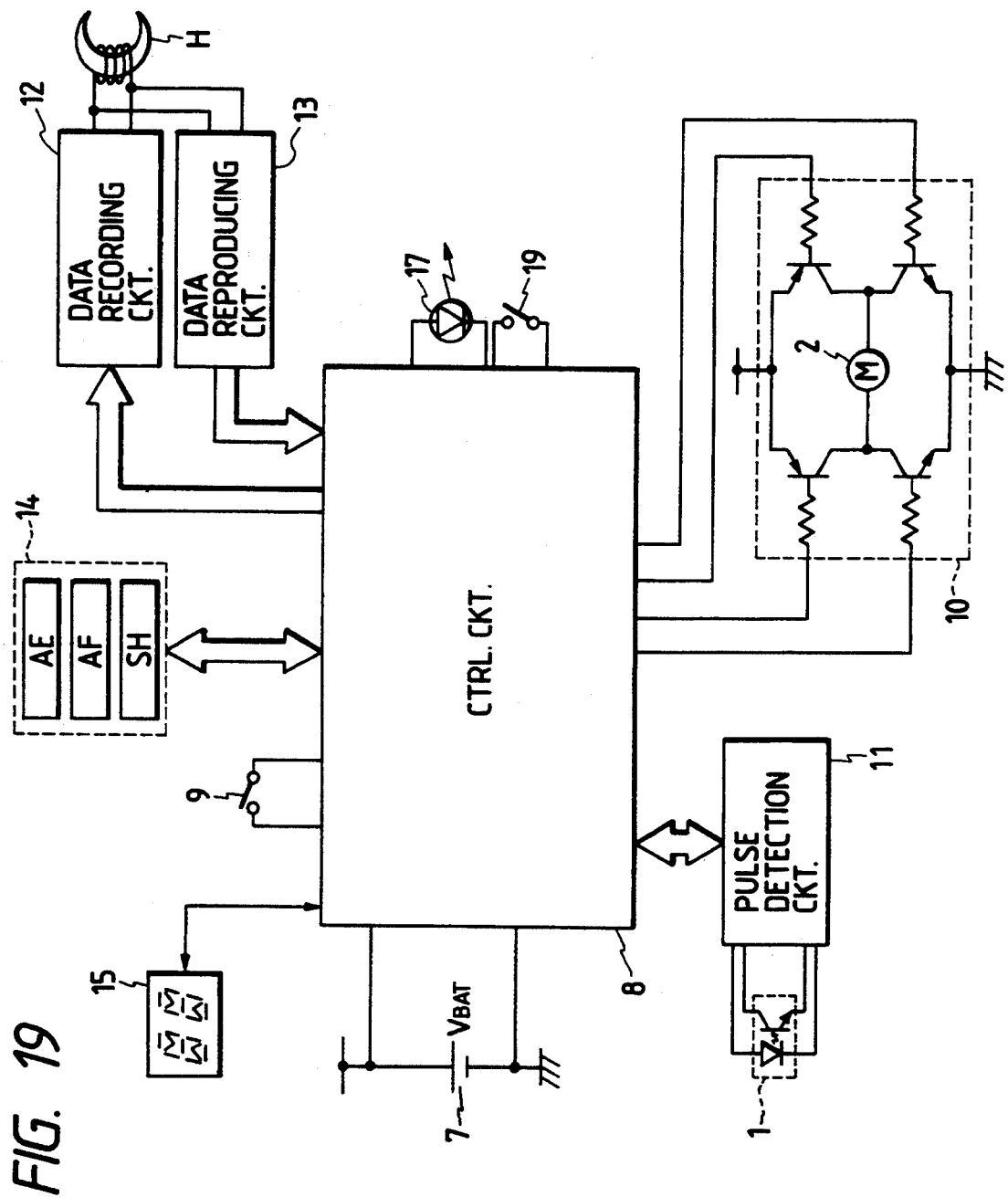
FIG. 19 is a block diagram of the essential portions of a camera as a tenth embodiment of the present invention.

FIG. 19 is a circuit block diagram of the essential portions of a camera as a tenth embodiment of the present invention.

In FIG. 19, the difference from FIG. 2 is a trimming input switch 19. This trimming input switch 19 effects trimming during printing and instruct the camera to write trimming data for obtaining such a photograph as if zooming was done.

Figure 20B:
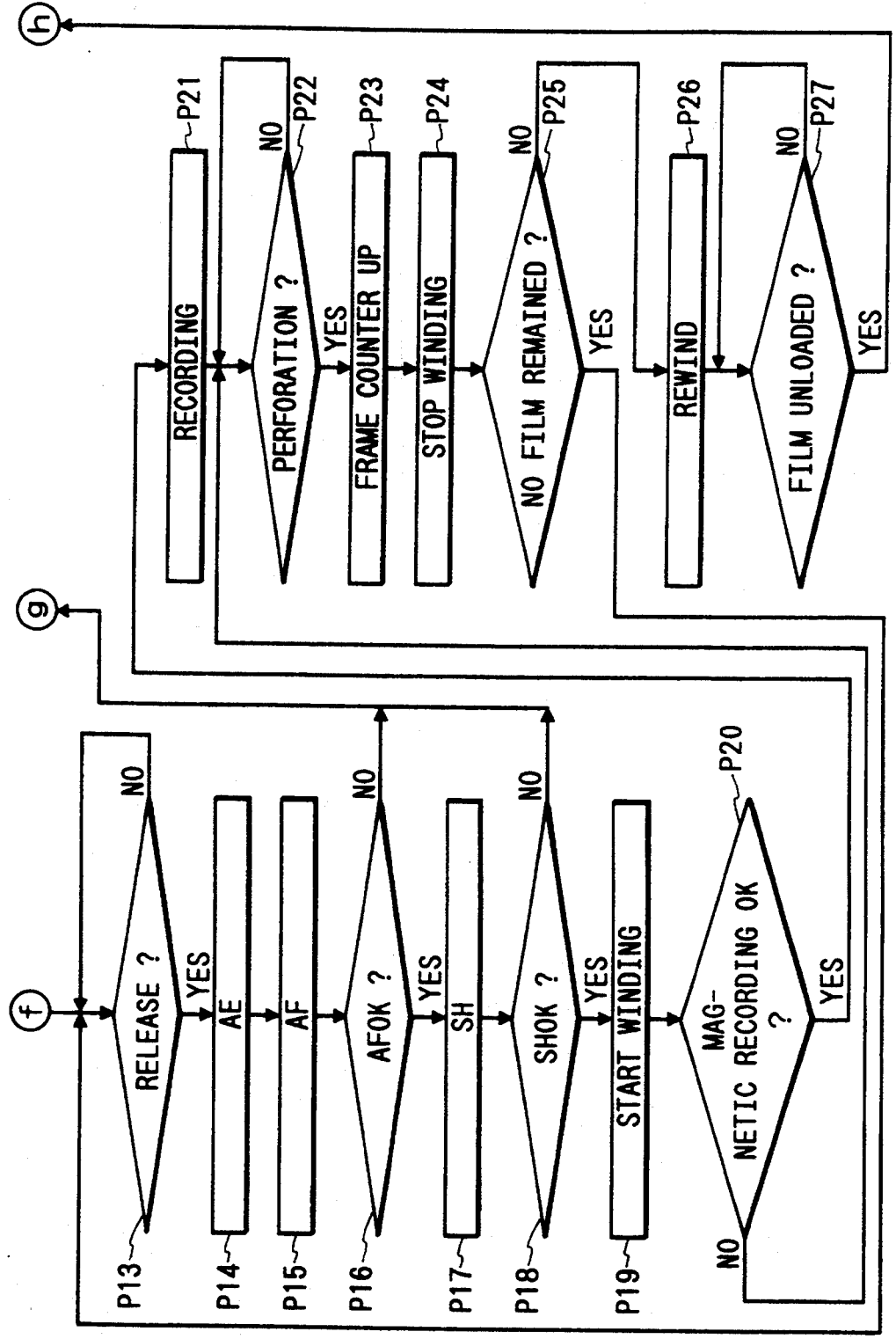
FIG. 20 is a flow chart showing the operation of the control circuit of FIG. 19.

FIG. 20 is a flow chart showing the operation of the control circuit 8 shown in FIG. 19, and description will hereinafter be made with reference to this flow chart.

[Step P1] Whether the film cartridge C has been loaded into the camera is discriminated from the state of the film presence-absence switch, not shown, and by it being discriminated that the film cartridge C has been loaded into the camera, advance is made to a step P2.

[Step P2] The film feeding motor 2 is rotated in the forward direction through the film feeding circuit 10 to thereby start the winding of the film F.

[Step P3] The magnetic head H and the data reproducing circuit 13 are driven to thereby start the reproduction of data such as film data and the prescribed number of frames pre-memorized in the magnetic memorizing portion T of the film F being wound.

[Step P4] Whether a perforation signal corresponding to one frame has been input from the photo-reflector 1 is discriminated through the pulse detection circuit 11, and if it is discriminated that the perforation signal has been input, advance is made to a step P5, and if the perforation signal has not been input, advance is made to a step P6.

[Step P5] The frame number indicated by the liquid crystal indicator 15 is counted up.

[Step P6] At this step, whether the reading-out of the data has been effected by the magnetic head H and the data reproducing circuit 13 during the feeding of the film (whether a magnetic signal exists) is discriminated. If as a result, the reading-out of the data has been effected, advance is made to a step P7, and if the reading-out of the data has not been effected, advance is made to a step P8.

[Step P7] Whether the count value (the number of exposed frames) counted at the step P5 has reached the first frame is discriminated, and if it has not reached the first frame, return is made to the step P4, and by it reaching the first frame, advance is made to a step P11.

[Step P8] As at the step P7, whether the number of exposed frames has reached the first frame is discriminated, and if it has not reached the first frame, return is made to the step P4, and by it reaching the first frame, advance is made to a step P9. That is, at the steps P4 to P8, whether the magnetic data could be reproduced while the film was wound up to the first frame after loaded into the camera is examined, and if the magnetic data could not be reproduced, advance is made to a step P9.

[Step P9] Since the reproduction of the magnetic data is bad, it is sufficiently expected that the magnetic recording means (at least one of the magnetic head H and the data recording circuit 12) will also be bad and therefore, the LED 17 is driven to display the error of magnetic recording and advance is made to a step P10.

[Step P10] The operation of the camera regarding the magnetic recording is prohibited and advance is made to a step P11.

[Step P11] The driving of the film feeding motor 2 is stopped through the film feeding circuit 10 to thereby stop the winding of the film F.

[Step P12] The driving of the magnetic head H and the data reproducing circuit 13 is stopped to thereby stop the reproduction of the data.

[Step P13] Whether the release switch 9 has been closed is discriminated, and by it being discriminated that the release switch has been closed, advance is made to a step P14.

[Step P14] The data of the object luminance is obtained by the AE-AF-SH circuit 14 to thereby determine the shutter opening-closing condition.

[Step P15] At this step, the data of the object distance is obtained by the AE-AF-SH circuit 14 to thereby drive the lens barrel and focus the lens on the object.

[Step P16] The lens barrel is driven to a position corresponding to the data of the object distance obtained at the step P15 and whether the lens is in focus to the object is discriminated. If as the result, the lens is not in focus, advance is made to a step P28, and if the lens is in focus, advance is made to a step P17.

[Step P17] The AE-AF-SH circuit 14 is driven and the opening-closing control of the shutter, i.e., exposure control, is effected on the basis of the shutter opening-closing condition obtained at the step P14.

[Step P18] Whether the opening-closing of the shutter has been normally effected is discriminated, and if the opening-closing of the shutter has been normally effected, advance is made to a step P19, and if the opening-closing of the shutter has not been normally effected, advance is made to a step P28.

[Step P19] The film feeding motor 2 is rotated in the forward direction through the film feeding circuit 10 to thereby start the winding of the exposed frame.

[Step P20] Whether at the step P9, the error of the magnetic recording means has been displayed is discriminated, and if the error has been displayed, advance is made to a step P22, and if the error has not been displayed, that is, if magnetic recording is OK, advance is made to a step P21. There may be a case where the magnetic recording means is not out of order and therefore, this step may be eliminated.

[Step P21] The magnetic head H is driven through the data recording circuit 13 to write the date of photographing, the shutter speed, the aperture value, trimming data, etc. into the exposed frame being fed.

[Step P22] Whether a perforation signal corresponding to one frame has been input from the photo-reflector 1 is discriminated through the pulse detection circuit 11, and by it being discriminated that the perforation signal has been input, advance is made to a step P23.

[Step P23] The number of frames indicated by the liquid crystal indicator 15 is counted up.

[Step P24] The driving of the film feeding motor 2 is stopped through the film feeding circuit 10 to thereby stop the winding of the film F.

[Step P25] At this step, the current number of frames is compared with the data of the prescribed number of frames introduced into the unshown means for detecting the last frame of the film, and if the film has come to an end (no frame remains), advance is made to a step P26, and if the film has not come to an end, return is made to the step P13.

[Step P26] The film feeding motor 2 is rotated in the reverse direction through the film feeding circuit 10 to thereby rewind the film F.

[Step P27] Whether the film cartridge C has been removed out of the camera is discriminated from the state of the film presence-absence switch, not shown, and by the removal being discriminated, return is made to the step P1.

If at the step P16 or the step P18, the error of focusing (the error of AF) or the error of the opening-closing of the shutter (the error of SH) is discriminated, advance is made to the step P28 as described previously.

[Step P28] At this step, the camera is immediately rendered inoperative because the photographing operation of the camera is out of order, and advance is made to a step P29.

[Step P29] The display of the error is effected by the LED 17 or the liquid crystal indicator 15.

[Step P30] Basically this step is the repair at the service station, and by this repair being terminated, the camera becomes operative, and return is made to the step P1.

Figure 21:
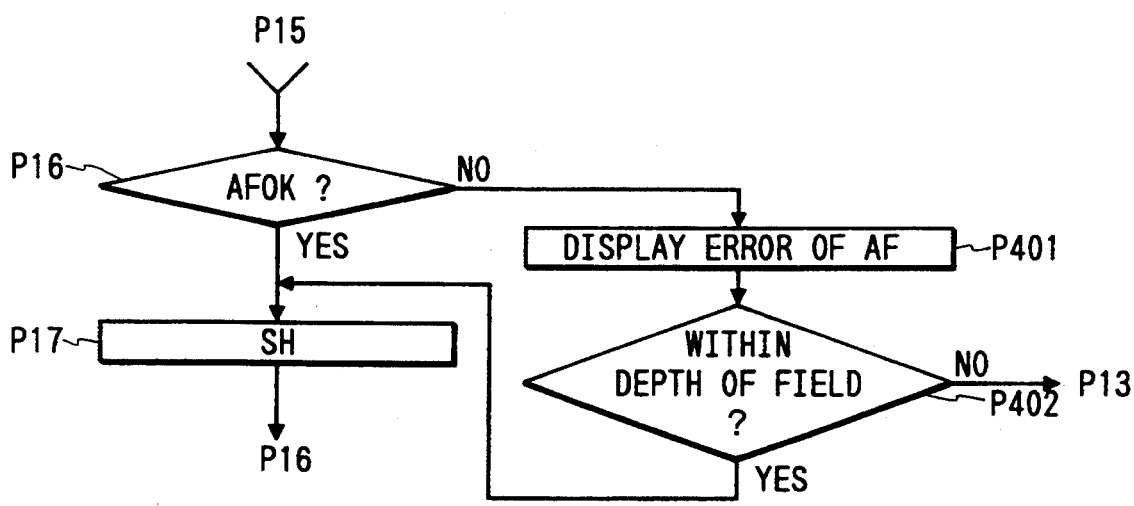
FIG. 21 is a flow chart showing the operations of essential portions in an eleventh embodiment of the present invention.

FIG. 21 snows an eleventh embodiment of the present invention which is an improvement over the flow chart of FIG. 20, and only improved portions are shown in FIG. 21.

If at a step P16, AF is bad, advance is made to a step P401, where the error of AF is displayed by the LED 17 or the liquid crystal indicator 15. Advance is then made to a step P402, where whether the object is within the depth of field is discriminated from the object distance data obtained by the distance measuring operation, the focus position of the lens barrel which has become bad and the brightness of the object obtained at the step P14, and if the object is within the depth of field, advance is made to a step P17, where photographing is progressed as described previously, and if the object is not within the depth of field, the subsequent photographing operation is prohibited and return is made to the step P13 is preparation for the next photographing.

Figure 22:
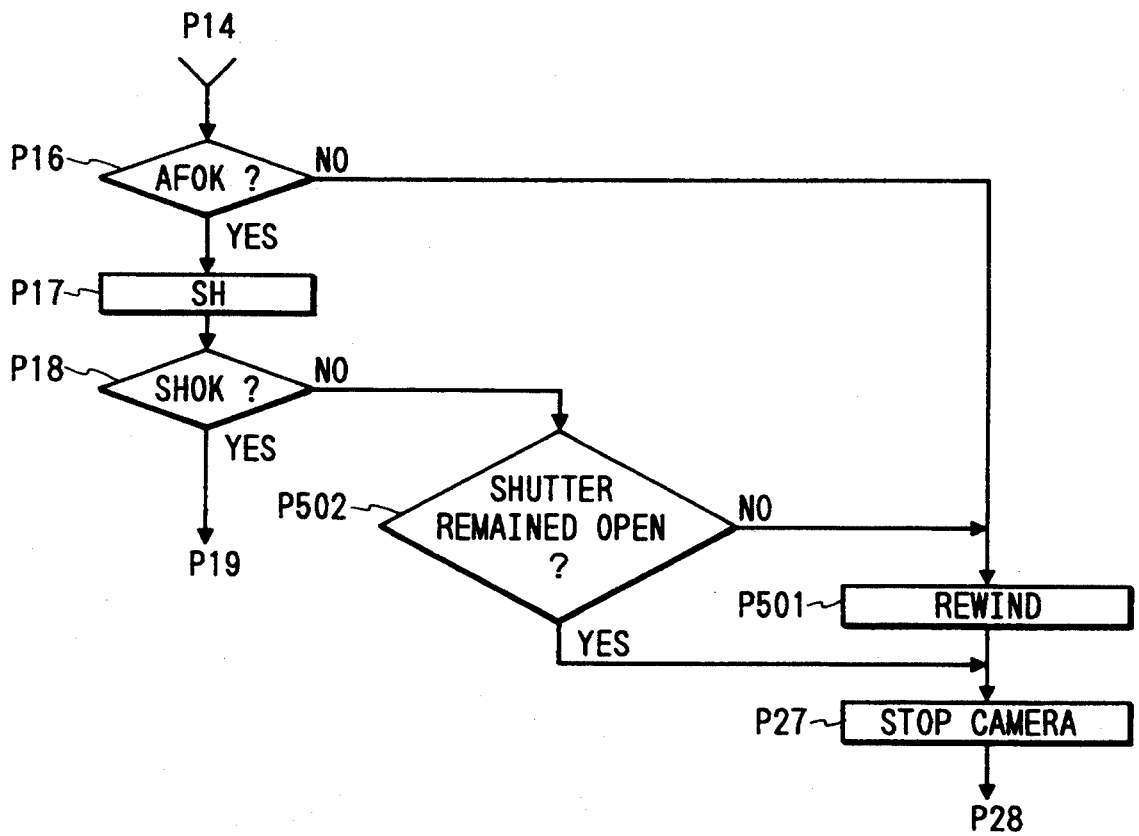
FIG. 22 is a flow chart showing the operations of essential portions in a twelfth embodiment of the present invention.

FIG. 22 shows a twelfth embodiment of the present invention which, like FIG. 21, is an improvement over the flow chart of FIG. 20, and only improved portions are shown in FIG. 22.

If at a step P16, AF is bad, advance is made to a step P501, where as at the step P25, the film F is rewound into the film cartridge C, and then advance is made to a step P27.

Also, if at a step P18, SH is bad, advance is made to a step P502, where whether the shutter has not been opened at all or remains open is discriminated, and if the shutter does not remain open, advance is made to a step P501, and if the shutter remains open, the step P501 is skipped and advance is made to a step P27 because if the film F is rewound, the film may be exposed through the shutter.

As a method of detecting the error of the magnetic recording means, there is a method of discriminating by whether an electric current flows through the breakage of the coil of the magnetic head H.

According to the above-described tenth to twelfth embodiments, when magnetic reproduction has not been normally effected (this is judged by the reproduction signal being not input), the trouble of the magnetic recording means is sufficiently considered and therefore, design is made such that in such a case, the camera is set to a first state in which only the photographing operation is progressed and that when there is a trouble of the shutter or the lens barrel, normal photographing cannot be expected and therefore the camera is set to a second state in which the camera is rendered inoperable and thus, the possibility is eliminated that only the photographing operation is possible, whereas this is prohibited and the shutter chance is missed. Also, when AF or SH is bad, the camera is rendered inoperable and therefore, the waste of the film is eliminated.

Modification

In the above embodiments, description has been made of the case where the magnetic recording means is out of order, but a similar process may also be carried out in a case where the magnetic reproducing means is out of order. That is, in the case of the trouble of the magnetic means (which comprises the magnetic recording means and the magnetic reproducing means), only the recording or reproduction of magnetic data may be prohibited and the ordinary photographing operation may be progressed.

As described above, according to the tenth to twelfth embodiments, design is made such that when the trouble of the magnetic means is detected, only the magnetic data processing operation by the magnetic means is prohibited and the photographing operation is progressed and that the trouble of the means for executing the photographing operation is detected, the camera is rendered inoperable and therefore, the user can be prevented from prohibiting the photographing operation and missing the shutter chance in spite of the photographing operation being possible, or wasting the film.

Figure 23:
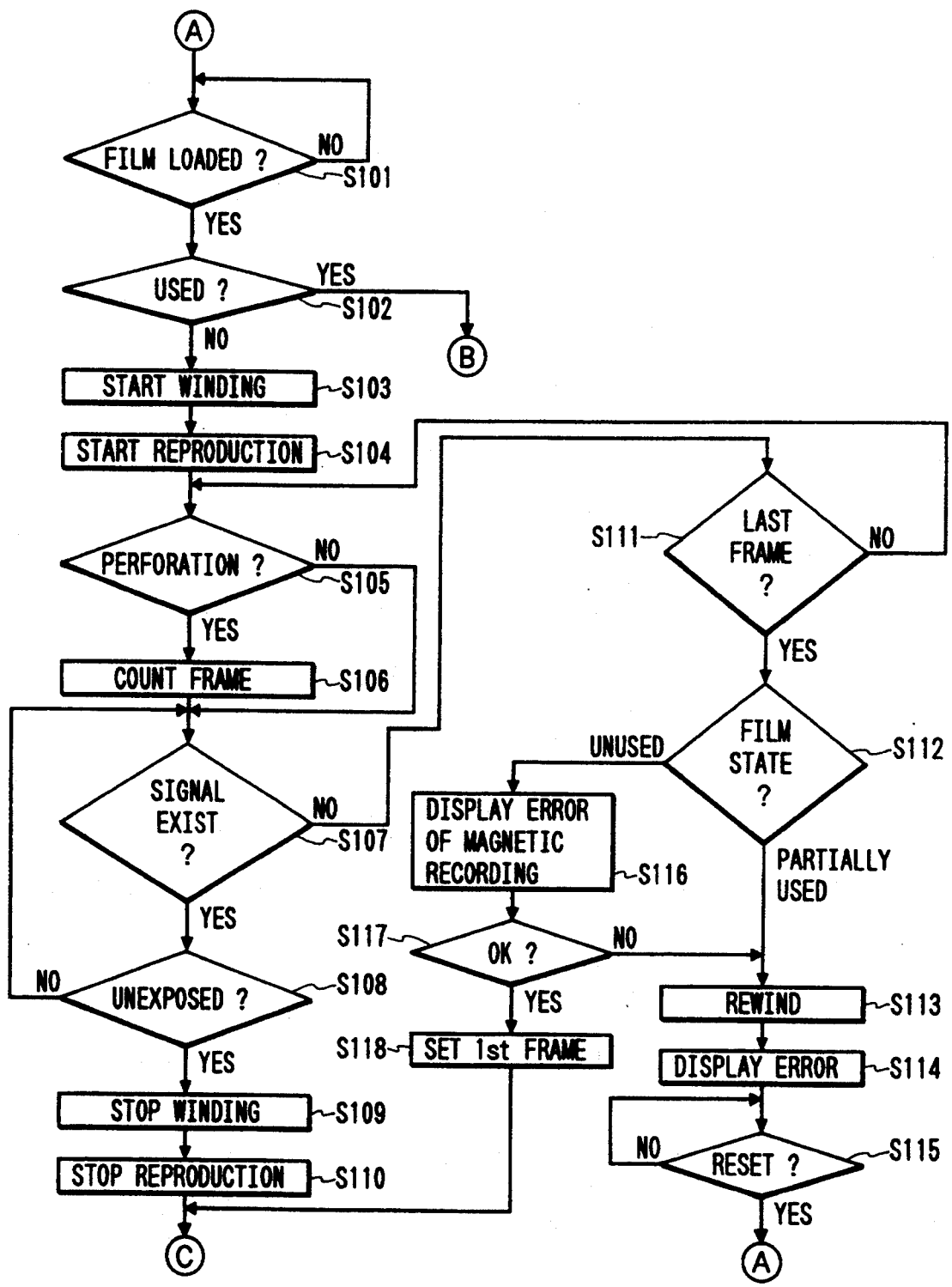
FIG. 23 is a flow chart showing the main processes in a thirteenth embodiment of the present invention.
Figure 24:
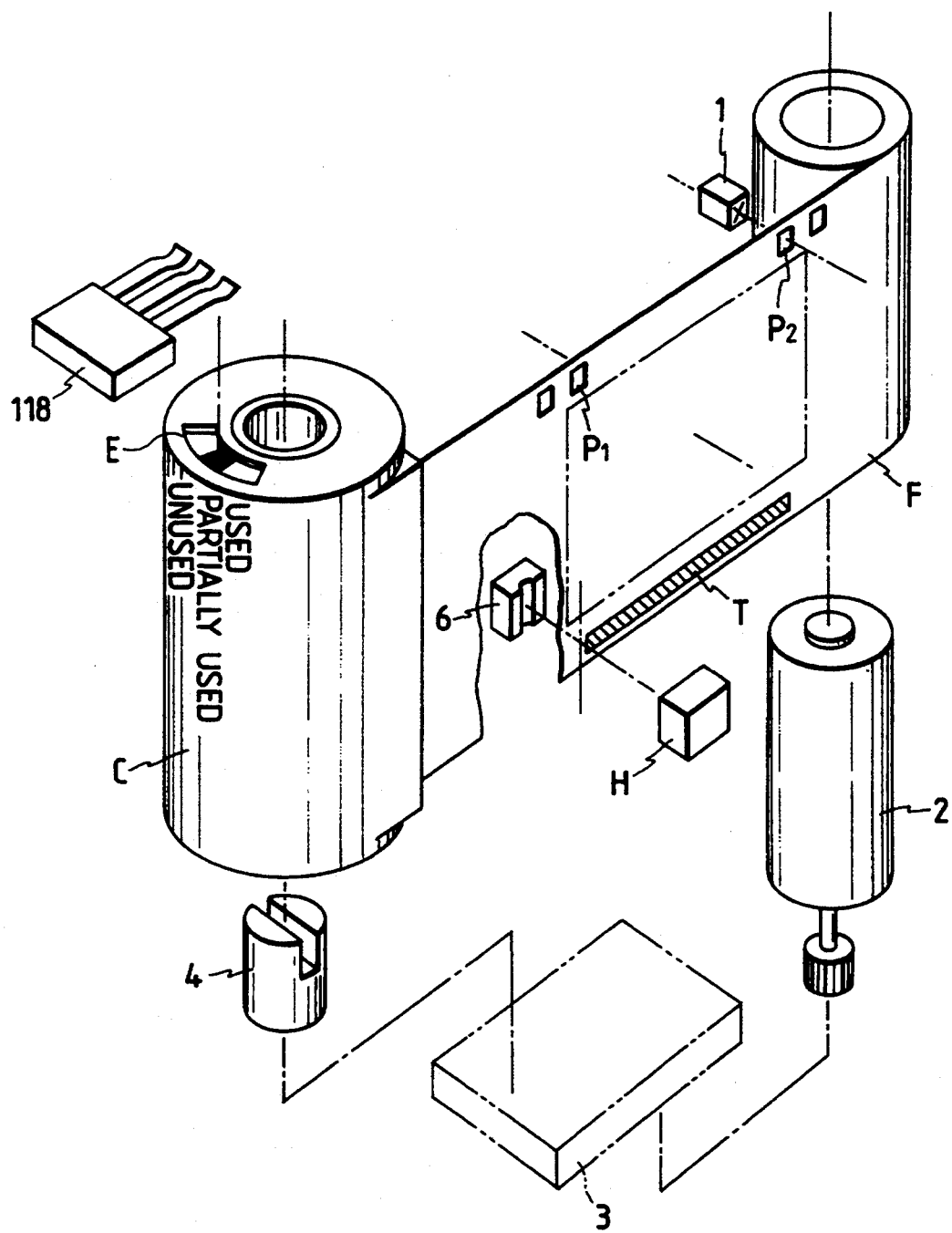
FIG. 24 is an exploded perspective view schematically showing the construction of the mechanism portion of the camera in the thirteenth embodiment of the present invention.
Figure 25:
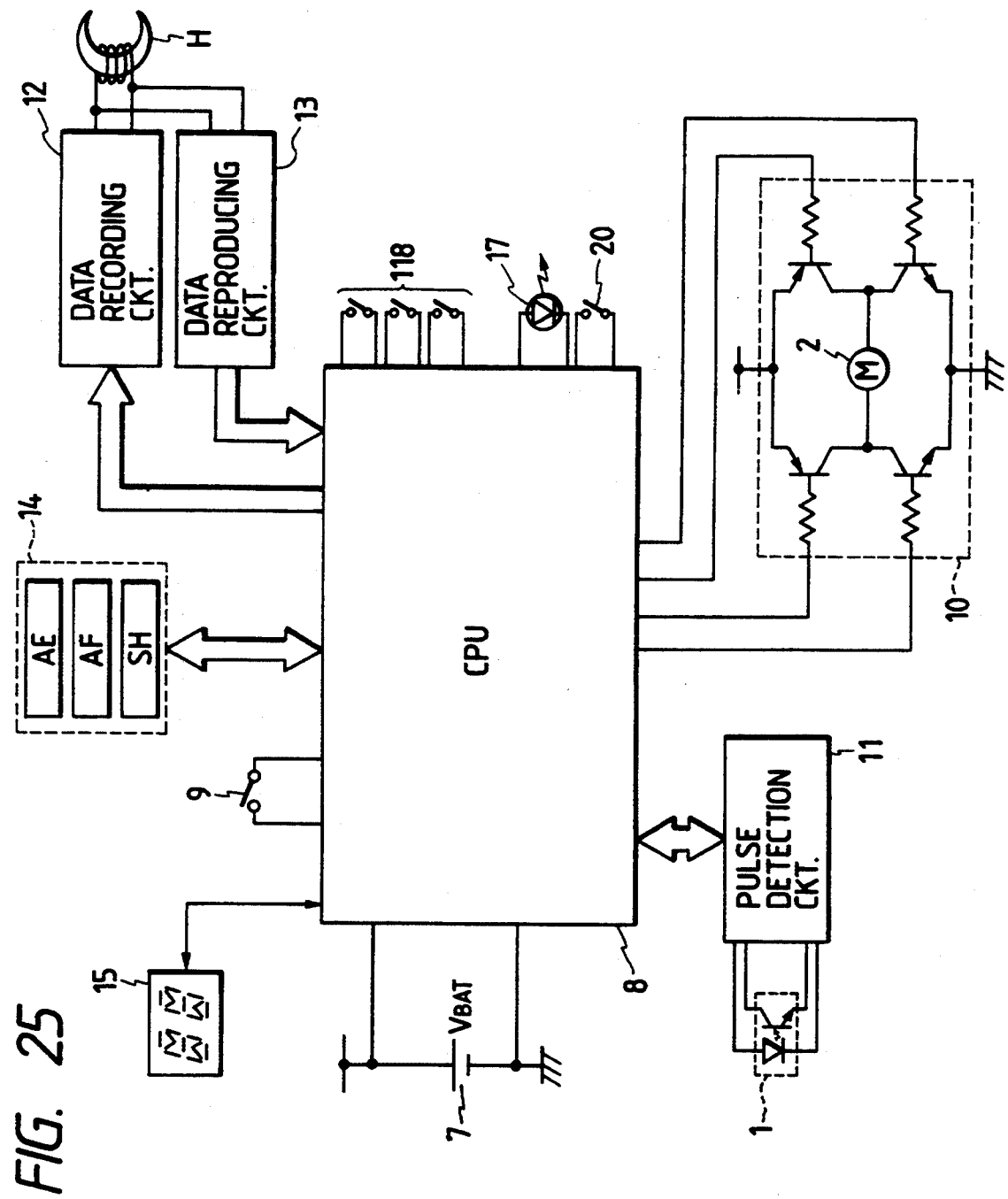
FIG. 25 is a block diagram showing the entire circuit of the electrical system of the camera in the thirteenth embodiment of the present invention.

FIG. 23 is a flow chart showing the processes of a camera according to a thirteenth embodiment of the present invention. FIG. 24 is an exploded perspective view schematically showing the construction of the mechanism portion of the camera according to the present embodiment, and FIG. 25 is a block diagram of the entire circuit of the electrical system of the camera according to the present embodiment.

The mechanism portion and electrical system of the camera will first be described with reference to FIGS. 24 and 25. In FIG. 24, only the differences thereof from FIG. 1 will be described.

On the upper surface of the film cartridge C, there is provided a film use situation display mark E for displaying the situations of use ("unused", "partially used" and "used") of the film. The reference numeral 118 designates a switch for detecting the state of use of the film in conformity with the display state of the film use situation display mark E.

The construction of FIG. 25 will now be described. Again in FIG. 25, only the differences thereof from FIG. 2 will be described.

The CPU 8 has connected thereto a release switch 9, a feeding circuit 10 for effecting the winding and rewinding of film F, a pulse detection circuit 11 for making the signal detected by a photo-reflector 1 for feeding into a signal which is receivable by the CPU 8, a magnetic data writing circuit 12 for transmitting a signal for recording photographing data on the track T of the film F by a magnetic head H, a magnetic reproducing circuit 13 for reading out the magnetic data written on the track T of the film F, an AE-AF-SH circuit 14 for effecting automatic exposure, automatic focusing and shutter opening-closing operation, a switch 20 for instructing whether photographing should be effected even when magnetic recording on the film F cannot be effected, and the switch 118 for detecting the state of use of the film.

Figure 26:
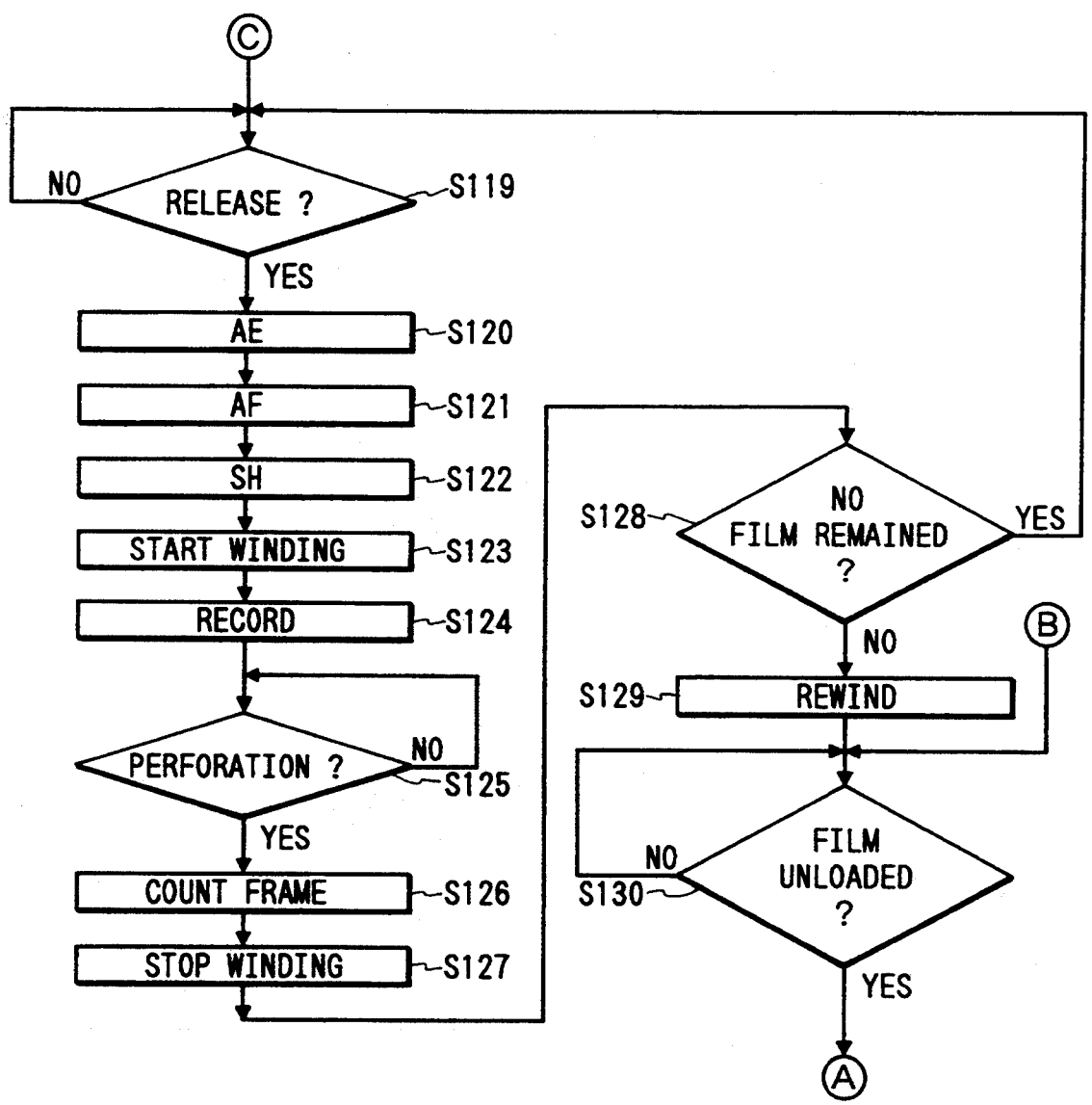
FIG. 26 is a flow chart showing the processes subsequent to FIG. 23.

An example of the process for achieving the present embodiment will now be described with reference to the flow chart of FIG. 23 and the flow chart of FIG. 26 subsequent to the process of FIG. 23. In these figures, the letter "S" means steps.

Whether the film cartridge C has been loaded into the camera is first confirmed by a cartridge presence-absence switch, not shown (S101). Then, whether the loaded film cartridge C is a used one, i.e., the state of the film use situation display mark E, is judged by the switch 118 (S102). If the film cartridge C is used a used one, the process of B of FIG. 26 and subsequent processes are executed, and if the film cartridge C is an used one, the film feeding motor 2 is driven to thereby start the winding of the film F (S103). Then, the reproduction of the magnetic data recording on the magnetic recording portion T of the film F is started by the magnetic head H and the data reproducing circuit 13 (S104).

Thereafter, perforations $P_1$ and $P_2$ are detected by the photo-reflector 1 for feeding, and if a prescribed number of perforations corresponding to one frame is confirmed (S105), frame counting is effected (S106). After this process and when the prescribed number of perforations has not been confirmed at the steps S105, whether the magnetic data have been read out by the data reproducing circuit 13 is judged (S107). If the magnetic data have been read out, whether the current frame is an unexposed frame is judged (S108). If the current frame is an unexposed frame, the film feeding motor 2 is stopped to thereby stop the winding of the film F (S109). Further, the reproduction of the magnetic data by the magnetic head H and the data reproducing circuit 13 is stopped (S110), and the process of C of FIG. 26 and subsequent processes are executed.

On the other hand, if at the step S107, the magnetic data have not been read out, the frame count value is compared with the maximum number of frames obtained from the DX code of the film cartridge C, or whether the current frame is the last frame (that is, whether the film F has ended) is judged by the perforations being not detected for a predetermined period or longer (S111), and if the current frame is not the last frame, return is made to the step S105, and the subsequent processes are executed. If the current frame is the last frame, the state of use of the film F is discriminated from the output of the switch 118, and whether the film F is partially used or unused is discriminated (S112). The judgment here needs to examine only whether the film is partially used, because at the step S102, it has already been judged that the film is not used one. If the film is unused one, it means that the magnetic signal has not been detected at all and therefore, the error of the data reproducing circuit 13 or the magnetic head H is considered. If the magnetic head H is bad, the error of magnetic writing may mean that the recording of the photographing data has not been effected. However, since the film is unused one, it is possible to effect photographing. So, as an immediate measure, it is displayed by the LED 17 that magnetic data recording is bad. Design is made such that whether photographing should be done even if an magnetic recording is bad can be judged by the photographer, and if photographing is OK (S117), the release switch 9 is closed, and the CPU 8 detects the operation of the switch 9 and sets the film F to the first frame (S118). That is, it has been determined that photographing should be effected and therefore, if perforations are detected and the film F is rewound until the frame count becomes 1, and the film is set to the first frame, the process C and subsequent processes are executed. On the other hand, if photographing should be stopped, the switch 20 is closed and this operation is detected by the CPU 8, whereafter advance is made to a step S113. At the step S113, the film F is all rewound into the film cartridge C (S113), and it is displayed by the LED 17 and the LCD 15 that there is an error in the camera (S114). Thereafter, the camera is brought to a service station for repair, and during the repair, the camera is reset (S115), whereby the process is returned to the step S101.

The process of FIG. 26 will now be described. This process is executed in subsequence to the step S110 and the step S102 of FIG. 23.

The ON/OFF of the release switch 9 is first detected (S119), and if the release switch 9 is ON, a series of photographing operations, i.e., photometry (AE), distance measurement (AF) and exposure (SH), are executed in succession (S120–S122). Then, film winding similar to the step S103 is started (S123), and the magnetic data (such as the date of photographing) are written into the magnetic recording portion T by the use of the magnetic head H and the data recording circuit 12 (S124). Thereafter, as at the step S105, the detection of perforations is effected (S125), and if a prescribed number of perforations corresponding to one frame has been detected, the stoppage of winding similar to the step S109 is effected (S127).

The current frame number is then compared with the DX code of the film cartridge C, not shown, or the maximum frame number in the magnetic data prerecorded on the film F (S128), and if the current frame number is equal to or less than the maximum frame number, return is made to the step S119, and if the current frame number exceeds the maximum frame number, the rewinding process is carried out (S129). At the step S129, the film feeding motor 2 is driven to thereby rewind the film and at a point of time whereat the rewinding has been completed, the film feeding motor 2 is stopped. This completion of the rewinding can be discriminated by counting the number of perforations and subtracting the frame count, or by the perforations having not been detected for a predetermined time.

The state of a film cartridge presence-absence switch, not shown, is then detected by the CPU 8, and when the removal of the film F is judged (S130), the process is returned to the step S101. After the removal of the film cartridge C, the film use situation display mark E is brought into the "used" position (or changeover means may be provided on the camera and the mark E may be changed over to the "used" position.

Figure 27:
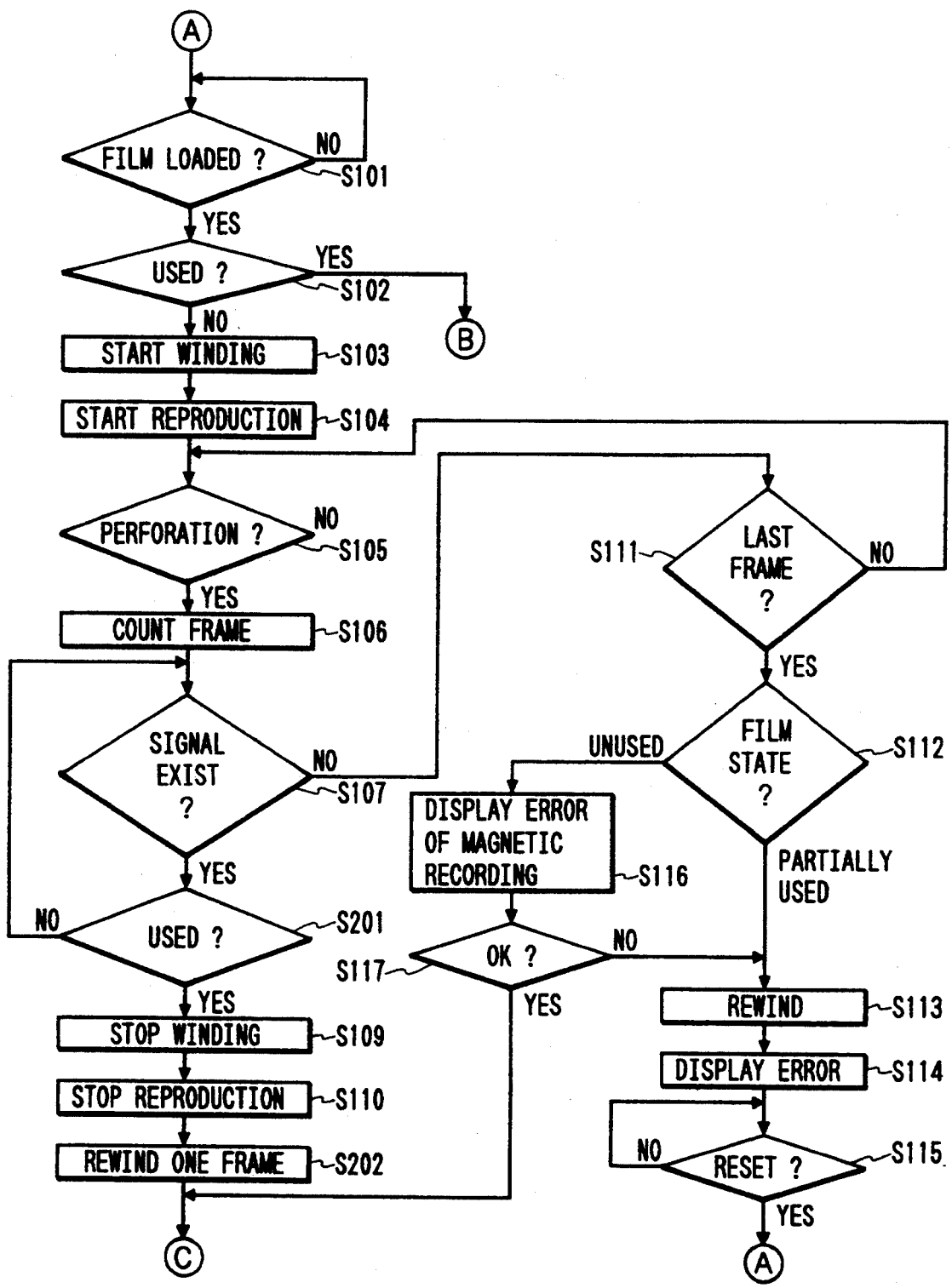
FIG. 27 is a flow chart showing the processes for a camera of the pre-wind type as a fourteenth embodiment of the present invention.
Figure 28:
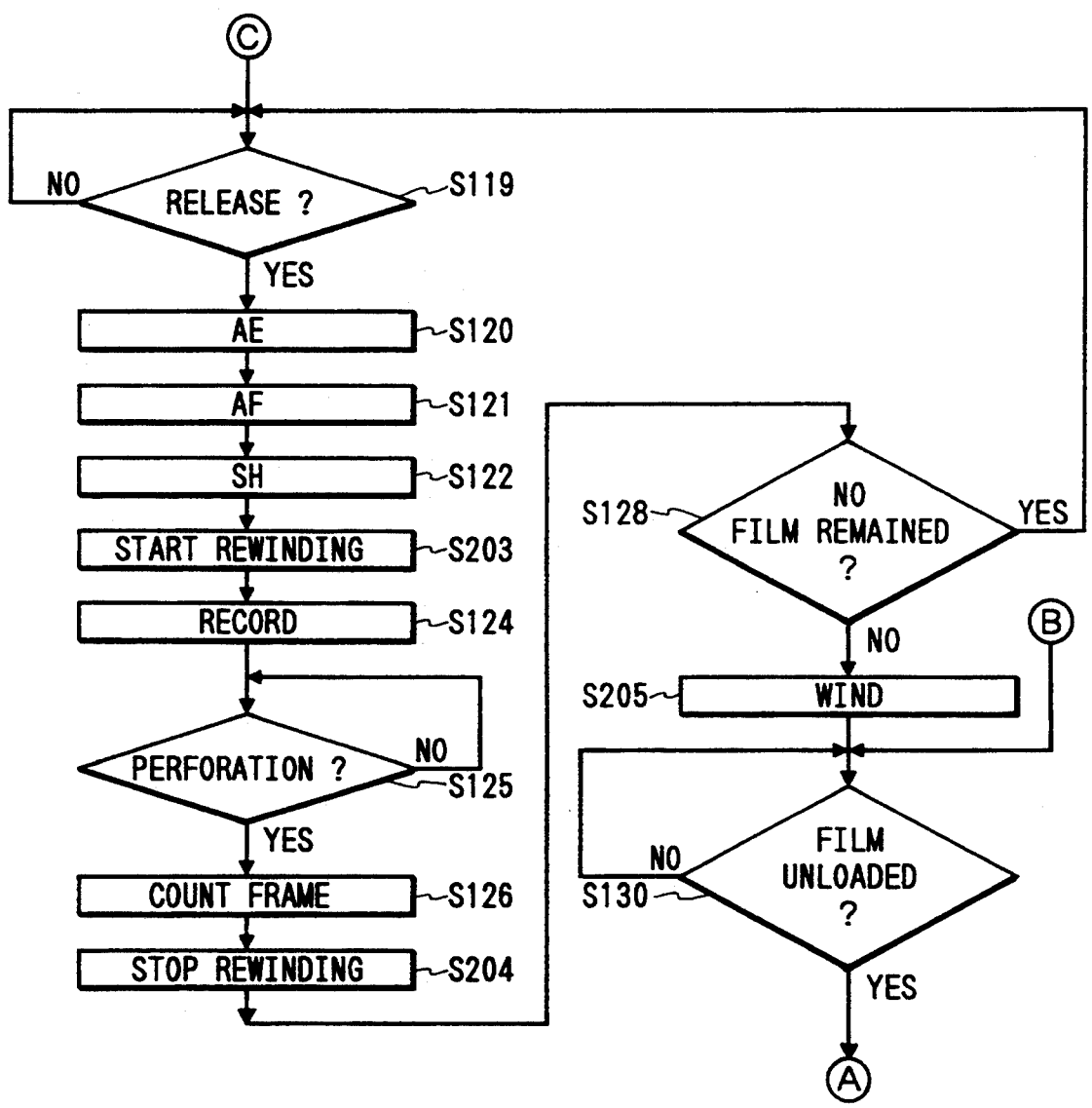
FIG. 28 is a flow chart showing the processes subsequent to FIG. 27.

FIGS. 27 and 28 are flow charts showing a fourteenth embodiment of the present embodiment. FIG. 28 shows the processes subsequent to FIG. 27. Also, in FIGS. 27 and 28, steps showing the same processes as those in FIGS. 23 and 26 are given the same step numbers and need not be described hereinafter.

The aforedescribed embodiment is directed to a normal wind type camera, whereas the present embodiment is directed to a pre-wind type camera. Therefore, the present embodiment is characterized in that in place of the step S108, a step S201 for carrying out the process for used frames is added, a step S202 for carrying out the process of rewinding one frame is added after the step S110 and the step S118 is eliminated, and further, in place of the step S127, a step S204 for carrying out the process of stopping rewinding is provided and in place of the step S129, a step S205 for carrying out the rewinding process is provided.

The reason why the step S202 is provided is that although in the pre-wind type, photographing is effected from the leading end of the film, it is considered that the frame is set to the photo-taking portion of the camera when "exposed" is judged. At the step S201, whether the magnetic data have been photographed is judged.

Also, because of the pre-wind type, the feeding after exposure is the rewinding, and at a step S203, the rewinding is started, and at the step S204, the rewinding is stopped. Further, at the step S205, writing is effected with the leader portion of the film F which is exposed out the film cartridge C being rewound for a predetermined time.

As described above, according to the thirteenth and fourteenth embodiments, in a camera which can be loaded with film contained in a thrust type film cartridge provided with film use state display means and having a magnetic recording portion capable of reading recorded data by a magnetic head, provision is made of film use state display means for detecting the state of use of the film from said film cartridge, reproducing means for reproducing magnetic data from said magnetic recording portion, and control means for effecting the photographing prohibition process in conformity with the presence or absence of the display "partially used" being displayed by said film use state display means and the presence or absence of the reproduction of said recorded data and therefore, even when magnetic reproduction cannot be effected, the prohibition of photographing is not immediately effected, but the prohibition of photographing is appropriately effected in conformity with the situation of use of the film and thus, no shutter change is missed.

What is claimed is:

1. A camera which can be loaded with a cartridge for a recording medium having a recording portion, said camera comprising:
   (a) a processing circuit for reproducing at least recording data recorded in the recording portion;
   (b) detecting means for detecting a state of use of the recording medium independently from the data reproduced by said processing circuit, said detecting means detecting the state of use of the recording medium from use state display means provided on the cartridge; and
   (c) a control circuit for, when a reproduction result of said processing circuit indicates that said processing circuit performs reproduction of the recording data, processing a predetermined operation of said camera and, when said processing circuit does not perform reproduction of the recording data, restricting the operation of said camera on the basis of the state of use of the recording medium detected by said detecting means.

2. A camera according to claim 1, wherein the recording medium is film.

3. A camera according to claim 2, wherein said processing circuit comprises a recording circuit for recording data in the recording portion.

4. A camera according to claim 2, wherein said control means prohibits a photographing operation from being executed if said detecting means detects that the film is partially used.

5. A camera according to claim 4, wherein said control means allows the photographing operation to be executed if said detecting means detects that the film is unused.

6. A camera according to claim 3, wherein said control means allows a photographing operation to be executed if said detecting means detects that the film is unused.

7. A camera having a film winding spool and which can be loaded with a cartridge for film having frames that each include a recording portion, said camera comprising:
   (a) feeding means for feeding film contained in the cartridge in a direction toward the film winding spool;
   (b) a processing circuit for reproducing data recorded in the recording portion of each frame during feeding of the film;
   (c) a detecting circuit for detecting a state of use of the film independently from the data reproduced by said processing circuit, said detecting circuit detecting the state of use of the film from use state display means provided on the cartridge; and
   (d) a control circuit for controlling an operation of said camera in accordance with data reproduced by said processing circuit, said control circuit having a determination circuit for determining whether photographing at a particular frame is permitted in accordance with the state of use of the film detected by said detecting means, when said processing circuit cannot perform reproduction of the recorded data.

8. A camera according to claim 7, wherein said determination circuit determines that photographing at the particular frame is prohibited if the film has been partially used.

9. A camera according to claim 8, wherein said determination circuit determines that photographing at the particular frame is permitted if the film is unused.

* * * * *

UNITED STATES PATENT AND TRADEMARK OFFICE
CERTIFICATE OF CORRECTION

PATENT NO. : 5,432,570
DATED : July 11, 1995
INVENTOR(S) : Toshiharu Ueda, et al.

It is certified that error appears in the above-indentified patent and that said Letters Patent is hereby corrected as shown below:

FIGURE 8:

Sheet 8 of 25, "PORFORATION" should read --PERFORATION--.

COLUMN 1:

Line 42, "film," should read --film--;
    Line 43, "film" should read --film,--; and,
    Line 65, "was" should read --is--.

COLUMN 2:

Line 12, "could" should be deleted;
    Line 34, "The" should read --the--; and,
    Line 49, "means;" should read --means--.

COLUMN 7:

Line 51, ""been" should read --been--.

COLUMN 12:

Line 64, "capable;" should read --capable--.

COLUMN 16:

Line 17, "snows" should read --shows--.

UNITED STATES PATENT AND TRADEMARK OFFICE
CERTIFICATE OF CORRECTION

PATENT NO. : 5,432,570
DATED : July 11, 1995
INVENTOR(S) : Toshiharu Ueda, et al.

It is certified that error appears in the above-indentified patent and that said Letters Patent is hereby corrected as shown below:

COLUMN 18:

Line 8, "used" (first occurrence) should be deleted;
Line 10, ""an used" should read --a used--;
Line 47, "used" should read --a used--;
Line 48, "unused" should read --an unused--; and,
Line 54, "unused" should read --an unused--.

COLUMN 21:

Line 1, "claim 3," should read --claim 2,--.

Signed and Sealed this

Twenty-sixth Day of December, 1995

Attest:

BRUCE LEHMAN

*Attesting Officer*     *Commissioner of Patents and Trademarks*